United States Patent [19]

Ricciardi et al.

[11] Patent Number: 5,171,756
[45] Date of Patent: Dec. 15, 1992

[54] THREE STAGE COOLING OF POROUS MATERIALS

[75] Inventors: Michael A. Ricciardi; Dzung G. Dai, both of Fort Smith, Ark.

[73] Assignee: Crain Industries, Inc., Fort Smith, Ark.

[21] Appl. No.: 738,402

[22] Filed: Jul. 31, 1991

[51] Int. Cl.$^5$ .......................................... C08G 18/14
[52] U.S. Cl. ............................ 521/55; 521/155; 521/918; 34/79
[58] Field of Search ................ 521/55, 155, 918; 34/79

[56] References Cited

U.S. PATENT DOCUMENTS

| Re. 32,032 | 11/1985 | Pettingell | 264/101 |
|---|---|---|---|
| 3,061,885 | 11/1962 | Rogers et al. | 18/48 |
| 3,874,830 | 4/1975 | Carter et al. | 425/4 R |
| 3,890,414 | 6/1975 | Ricciardi et al. | 264/45.1 |
| 4,228,076 | 10/1980 | Pettingell | 264/321 |
| 4,344,903 | 8/1982 | Pascouet | 264/55 |
| 4,435,523 | 3/1984 | Ponzielli | 521/51 |
| 4,537,912 | 8/1985 | Griswold | 521/918 |
| 4,731,208 | 3/1988 | Nakayama | 264/37 |

FOREIGN PATENT DOCUMENTS

| 2017991 | 12/1990 | Canada . |
| 2017992 | 12/1990 | Canada . |
| 2456421 | 8/1976 | Fed. Rep. of Germany . |
| 2904943 | 8/1979 | Fed. Rep. of Germany . |
| 2945856 | 5/1981 | Fed. Rep. of Germany . |
| WO8604017 | 7/1986 | PCT Int'l Appl. . |
| 2014168 | 8/1979 | United Kingdom . |

OTHER PUBLICATIONS

J. H. Webb and A. C. M. Griffiths, Flexible Polyurethane Foam Slabstock Manufacture Through the Next Decade, 30th Annual Polyurethane Technical/Marketing Conference (1986) pp. 62–66.

Primary Examiner—Maurice J. Welsh
Attorney, Agent, or Firm—Pennie & Edmonds

[57] ABSTRACT

A process for rapidly cooling porous foam material to prevent oxidation or autoignition of said foam. The process includes a first cooling step wherein cooled ambient air is drawn through the foam block thereby cooling, dehumidifying and removing fumes from said block before being vented, a second cooling step wherein cooled ambient air is drawn through the block for further cooling thereof, with sublimates in the block being condensed and redeposited within the block, and a third cooling step wherein ambient air is drawn through the material so as to remove remaining fumes, heat and moisture therefrom. The process of the present invention advantageously utilizes a foam formulation which includes an increased percentage of water for providing adequate foaming of the material while minimizing or obviating the need for including toxic auxiliary blowing agents in the formulation. In addition, the formulation may also have a lower TDI index as compared to formulations utilized in conventional cooling methods because TDI is condensed and recycled back into the foam. An apparatus especially configured and adapted for practicing the process of the present invention is also disclosed.

47 Claims, 19 Drawing Sheets

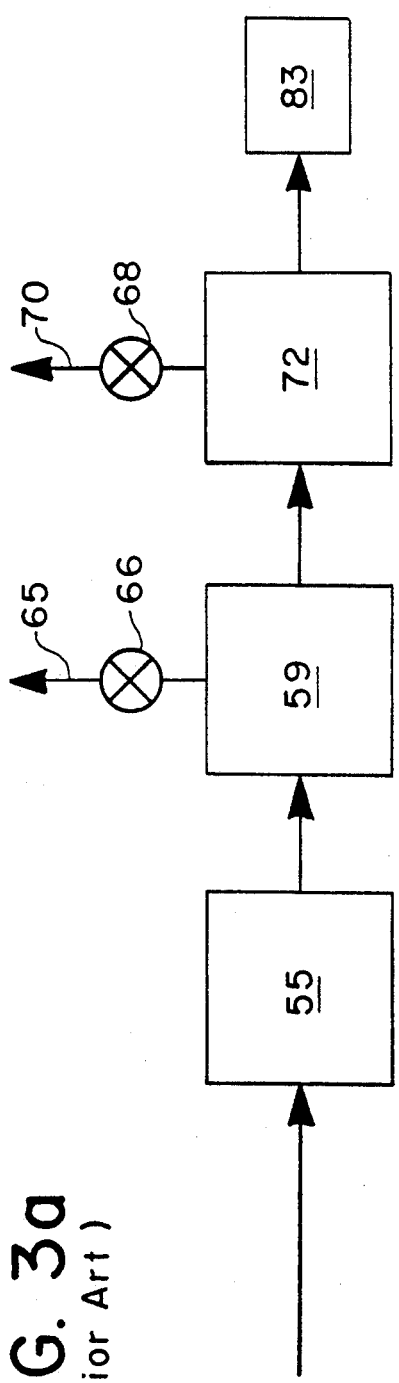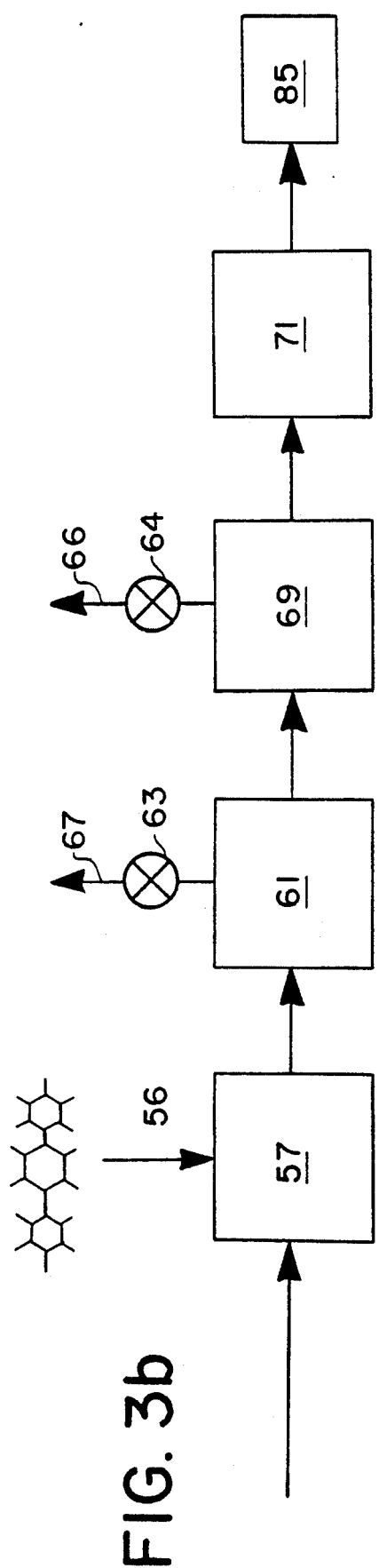
FIG. 3a (Prior Art)
FIG. 3b

THREE STAGE COOLING OF POROUS MATERIALS

FIELD OF THE INVENTION

The invention relates to production of porous materials. It is of general application but is described in particular in relation to the production of plastic foams, and especially polyurethane foams.

BACKGROUND ART

Processes for the production of polymeric foams by reactive chemical routes are varied and well known. An example of such polymeric materials is flexible polyurethane foam which is produced in blocks typically 2 meters×2 meters×1 meter. These large blocks can be produced either continuously on conveyor type machines or discontinuously in molds.

Flexible polyurethane foam is formed by a reaction between a high molecular weight polyol and a diisocyanate. This reaction is highly exothermic reaching a peak, as depicted in a time/temperature curve, typically within about 5 to 30 minutes. Polyurethane foam therefore have to be transferred to an intermediate "cure area" promptly after initial cure where they are carefully stacked with air space around each block until they have cooled. A large area is required for this purpose and the blocks typically need to be stored for a minimum of 10 hours before they can be restacked or loaded for transporting to the customer. This process of intermediate storage, to ensure adequate cooling of the blocks, is inconvenient and costly in space requirements. Further, the intermediate storage area contains a large number of blocks of inflammable foam at high temperature, presenting a potential fire hazard. The building used for this intermediate storage needs to be specially constructed to meet fire regulations.

A further important factor is that certain of the foam forming reactions are reversible at high temperature, typically the allophanate reaction following the initial polyurethane bond formation. The blocks of foam in the intermediate storage area frequently, exhibit an internal temperature exceeding 140° C. for several hours. If the ambient atmosphere in the intermediate area is not controlled, i.e. is of variable humidity, there is a potential for ingress of moisture into the block which will react with free isocyanate end groups and terminate them:

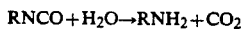

$$RNCO + H_2O \rightarrow RNH_2 + CO_2$$

This reaction, removing the isocyanate required for the allophanate reaction, results in a reduced, uncontrolled level of cross linking in the foam and therefore a variable, reduced stiffness or compression hardness. In geographical locations where a high ambient humidity is common, it is known for foamers to increase the quantity of isocyanate in a given foam recipe deliberately, in spite of the cost penalty in doing so, so as to allow for the hardness loss that would otherwise be experienced.

It has been proposed in PCT/GB85/00605 (published No. WO 86/04017) to use a new approach of early cooling, and specifically a method of making blocks of polyurethane or other foam arising from exothermic reaction of foam-forming materials, wherein once the reaction has reached a desired stage of completion a gas of suitable composition and temperature is passed through the body of the block to carry away the heat of reaction. Other earlier proposals are those of Riccardi et al. U.S. Pat. No. 3,890,414 (published 1975) and Continental Gummi Werke German OLS 2,456,421 published 1976). The cooling gas as proposed will normally be air, and the approach is the reverse of the conventional approach of slow cooling and minimum exposure to air while cooling takes place.

The conventional approach has to be seen in the light of a long standing problem in the polyurethane foam industry, namely autoignition of foam blocks due to excessive heat caused by the exothermic polyurethane bond forming reaction. The problem occurs particularly with certain low density and high exotherm grades of foam, or foams containing additives which are included to render the foam resistant to small sources of ignition. Such foams can, after a period of two to three hours, and after they have started to cool, begin to increase in temperature again. This second exotherm is normally a self progressive type, eventually resulting in autoignition. Several factories have been burned down because of this phenomenon. One mechanism believed responsible for auto ignition is the drawing in of air from the atmosphere as the block cools. The oxygen enriched atmosphere within the block then causes exothermic oxidation of the polyurethane polymer with a resulting temperature rise. The presence of air drafts around the blocks has been shown to exacerbate the problem.

A newer approach is to deliberately draw cool air through an initially cooled polyurethane block. The composition of the air, at least as to moisture content, may be controlled, but such control alone has been found insufficient to achieve satisfactory results. Cool air drawn through the block removes heat, volatile gases, sublimates and excess water from the block.

Polyurethane foam commonly contains butylated hydroxy-toluene ("BHT" full name 2,6-ditertiarybutyl-4-methyl phenol), which is used as an antioxidant in the polyols that are reacted with isocyanates such as toluene diisocyanate ("TDI") to form the foam. BHT is a solid subliming at 70° C. and therefore taken up in cooling air passed through blocks exhibiting an initial temperatures of 140° C. or higher. The cooling air is desirably recycled for heat recovery, control of moisture content, and to prevent uncontrolled levels of residual isocyanate or auxiliary blowing agents such as chlorofluorocarbons ("CFCs") or other volatile compounds such as methylene chloride or 1,1,1-trichloroethane from reaching the atmosphere. For the purposes of the present specification, the terms "auxiliary blowing agent" and "auxiliary foaming agent" will be used interchangeably. Both of these terms refer to compounds added to a porous foam formulation in order to liberate a gas during subsequent chemical reaction. It is the liberation of gas that results in the foaming of the material.

In the past, air has been recycled through a heat exchanger. The heat exchangers have been rapidly blocked up with a solid deposit of BHT together with some polyurea formed from residual TDI and moisture. Other antioxidants and additives have caused similar problems.

U.S. patent application Ser. No. 07/531,958 (the "'958 application"), discloses another approach utilized for rapid cooling of porous materials. The process provides a partial solution for the problem with volatiles taken up from the hot material and later separating out and blocking heat exchangers. The '958 application discloses a process wherein the blocking problem is prevented by mixing heated gases coming from a first part of a cooling zone, and carrying the volatiles, with cold gases extraneous or coming via a heat exchanger from a second or subsequent part of the cooling zone, so that the volatiles separate out. The mixed gases which are passed through the porous material in the second or subsequent part of the cooling zone are substantially filtered within the porous material rather than in the heat exchanger.

The '958 application discloses a process and plant for cooling of porous materials. Specifically, the process concerns blocks of polyurethane or other open cell foamed plastics prepared from an exothermic reaction of foam forming materials. In the process, volatiles within the porous blocks are taken up by cooling gases and separate out therein on cooling of the gases below a separation (i.e. sublimation or condensation) temperature, characterized by:

i) effecting the cooling of the porous materials in two or more successive zones, ii) mixing gases emerging from the first zone, carrying the volatiles, with gases at a lower temperature, particularly gases emerging from the second or subsequent zones and thereafter cooled by heat exchange, whereby the temperature of the mixed gases is brought below the separation temperature, and iii) passing the mixed gases through the porous material to filter out the separated volatiles.

Thus, first gases are passed through the porous material in a first zone to cool the porous material and to remove volatiles therefrom in a first gas mixture which exits the porous material. The flow rate of the first gases through the porous material is controlled to provide a controlled, uniform cooling rate thereof. This first gas mixture is combined with second gases having a lower temperature to form a second gas mixture having a temperature which is sufficiently low to condense one or more of the volatiles.

Finally, the second gas mixture is passed through the porous material in a second zone to filter condensed or sublimed volatiles thereon and to further cool the porous material.

It is also desirable to remove particulate matter from the first gas mixture prior to mixing with the second gases. Also, particulate matter may optionally be removed from the second gases prior to mixing with the first gases. This removes certain materials from the gas streams and prevents later buildup on the heat exchangers which are utilized to cool the gas.

Even though the '958 application discloses an improved method for cooling polyurethane foam, several disadvantages still remain. The process of that application utilizes a heat exchanger in order to provide cool air for both reducing the temperature of a first porous block as well as to force the condensation of volatile material within a second porous block. Although the process utilizes the second porous block to effectively filter much of the BHT and TDI (TDI plus moisture forming polyurea) that had clogged heat exchangers and recuperators utilized in past apparatus, a portion of the BHT and TDI still passes unfiltered through the block. Therefore, over a prolonged period of time, clogging of the heat exchanger and recuperator will still occur.

Conventional foaming materials contain a substantial amount of solvent or auxiliary blowing agents such as chlorofluorocarbons which are released into cooling gas currents during the exothermic curing cycle. High concentrations of such compounds in the cooling gas necessitates recycling if emission of pollutants is to be avoided.

Water is a preferred foaming agent for forming polyurethane foam. Water reacts with an isocyanate group to form an intermediate carbamic acid which liberates carbon dioxide gas. However, as desirable as water is during the foaming phase of polyurethane form production, it may later deleteriously effect the foam by terminating free isocyanate groups as discussed above. Thus, water is normally used in combination with other blowing agents.

A uniform distribution of free isocyanate groups is required for producing foam with a predictable degree of cross-linking (and therefore stiffness and hardness). It would be desirable to utilize an increased amount of water in the polyurethane formulation so as to provide sufficient foaming without utilizing toxic auxiliary foaming agents. It would be of further advantage to simultaneously eliminate excess water during later curing of the foam which would otherwise interfere with polyurethane cross-linking.

In the past, a decreased amount of water has been utilized in polyurethane foam formulations in order to prevent the above-discussed interference with polyurethane cross-linking. In order to ensure adequate foaming in such formulations, auxiliary blowing agents such as the chlorofluorocarbons were utilized. As explained above, such agents present in foam formulations in large quantities pose a toxic threat and require recycling.

What is needed is a method of rapidly cooling polyurethane foam wherein the heat liberated during exothermic reaction is controlled so as to prevent slow oxidation or outright ignition of the foam. At the same time, a method for fabricating polyurethane foam is needed wherein the polyurethane foam formulation includes a greater quantity of water as a foaming agent without causing interference with cross-linking of the polyurethane, thereby reducing or eliminating the need for utilizing toxic auxiliary foaming agents.

SUMMARY OF THE INVENTION

Now in accordance with the present invention, a method is provided for rapidly cooling polyurethane foam following initial polyurethane foam formation wherein oxidation or ignition associated with exothermic curing of the polyurethane is prevented. The method of the present invention also allows the use of novel polyurethane foam forming formulations which include a greater quantity of water as a foaming agent so as to minimize or obviate the need for auxiliary blowing agents while achieving satisfactory foaming and foam properties. The method of the present invention removes excess water remaining after the foaming of the polyurethane so as to prevent the water from interfering with cross-linking of the foam. This method provides rapid cooling of polyurethane foam blocks and enables physical qualities equal to blocks which are conventionally cured, while at the same time, decreasing the emission of pollutants.

BRIEF DESCRIPTION OF THE FIGURES

FIG. 3A and 3B are flow charts illustrating emissions generated during the method of the present invention when two different polyurethane formulations are utilized;

DETAILED DESCRIPTION OF THE PREFERRED EMBODIMENT

Figure 1:
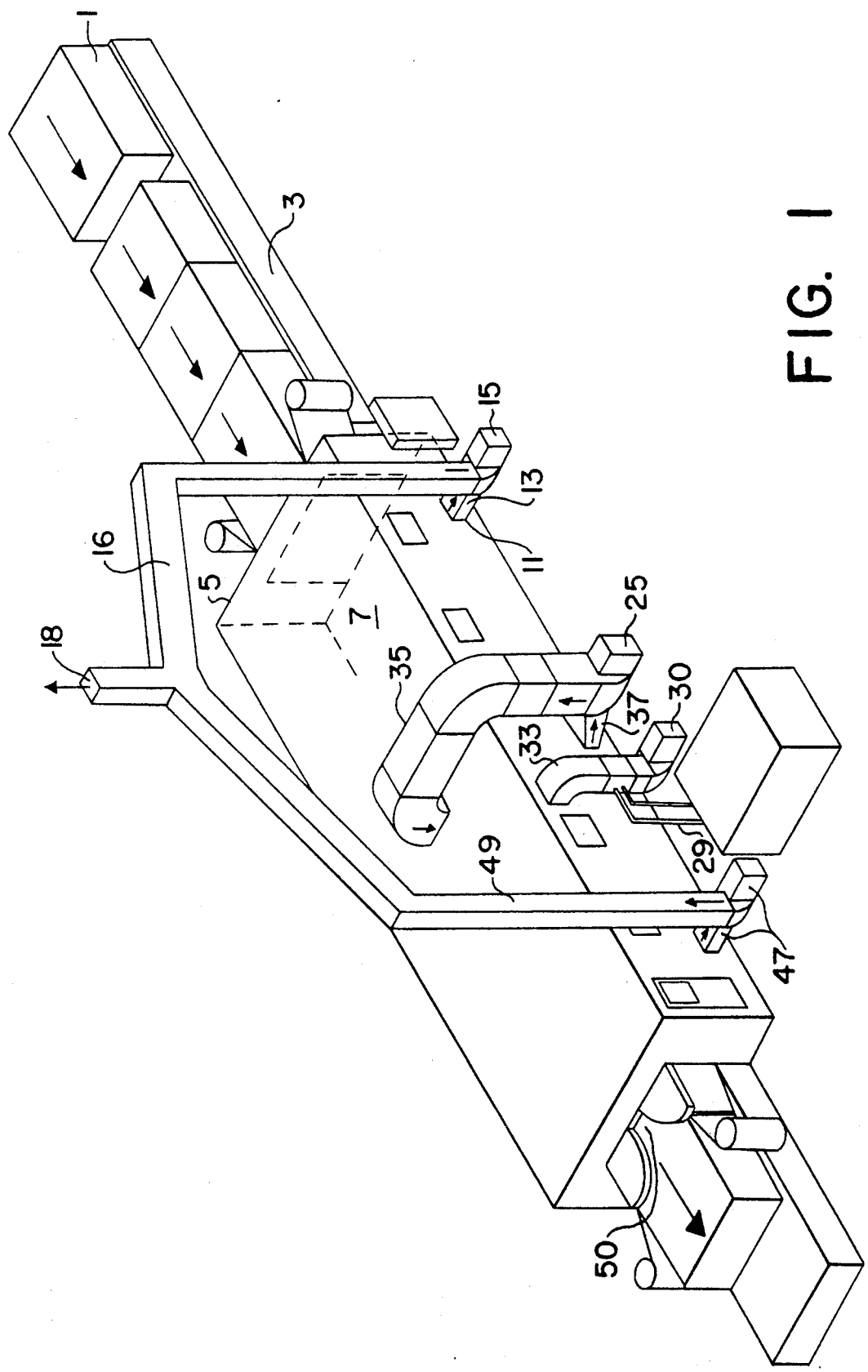
FIG. 1 illustrates a side elevated view of one embodiment of an apparatus of the present invention.

In the first step of the present invention, polyurethane foam blocks are subjected to ambient air cooling just after a peak is reached in the time/temperature curve of the exothermic polyurethane reaction. At this point, the internal block temperature of the polyurethane ranges from about 250° to 500° F. and usually about 370° to 400° F. As ambient air is drawn through the block, excess moisture, heat, vapors and sublimates are removed. The term excess moisture refers to that quantity of water not utilized in the foaming of the polyurethane which, if allowed to remain as a vapor in the block, would interfere with further curing. During periods of high ambient air humidity it is preferred to dehumidify the air prior to drawing it through the block so as to increase the capacity of the air to remove excess water from the material, while at the same time preventing the ambient air from introducing additional water therein.

After the ambient air is drawn through the polyurethane foam block, it may be is vented to the atmosphere. The temperature of the ambient air after passing through the foam block will generally range from about 160° to 180° F.

During the initial polyurethane formation reaction water is utilized as a foaming or gassing agent. Water reacts with an isocyanate group to form a carbamic acid (transitionally). The carbamic acid in turn yields an amide and carbon dioxide gas. The following reaction is representative of a typical foaming reaction:

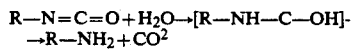

$$R-N=C=O + H_2O \rightarrow [R-NH-C-OH] \rightarrow R-NH_2 + CO_2$$

In a second cooling step of the present invention, ambient air is recirculated through the foam block. The ambient air recirculated through the foam block removes additional heat moisture, and sublimates therein. After the ambient air is recirculated through the foam block, it is mixed with fresh additional chilled ambient air. The term "fresh" refers to ambient air not having passed through the block.

As discussed and illustrated in the above reaction, water removes isocyanate groups from TDI which would otherwise be utilized for further cross-linking reactions with hydroxyl groups of polyols. By utilizing the first step of the present invention to remove excess water remaining after the initial curing of polyurethane is completed, an increased amount of water sufficient to yield substantially all of the foaming required in a polyurethane foam material may be utilized in a polyurethane formulation.

It is thus no longer necessary to utilize a reduced amount of water, insufficient by itself to provide adequate foaming, in order to prevent later interference with cross-linking. Therefore, the present invention advantageously obviates or minimizes the use of auxiliary foaming agents heretofore necessary to provide sufficient foaming. Since auxiliary foaming agents result in emissions that are ecologically harmful, the present invention allows the use of an environmentally harmonious alternative polyurethane foam formulations.

The temperature of the air exiting the first section via the first section of the enclosed tunnel of the present invention ranges from about 150° to 185° F. Although, as explained above, the first section vents directly to the atmosphere, the reduction or elimination of toxic auxiliary blowing (or foaming) agents such as chlorofluorocarbons from the polyurethane formulation minimizes the environmental effect of such venting.

As discussed above, the second cooling step forces both fresh (non-recycled) cooled air and recycled air through the polyurethane foam block. Fresh ambient air is constantly added to the recycled air which, as explained above, contains sublimates such as TDI and BHT. When the air, after initially passing through the polyurethane block, mixes with fresh additional chilled air, a temperature reduction takes place causing a condensation of sublimates, such as TDI and BHT, within the air.

The cooling means utilized in the apparatus of the present invention provides a reduction of ambient air temperature such that the mixture of ambient and recycled air in the second step exhibits a temperature range of from about 100° to 160° F.

Since BHT condenses at temperatures below about 70° C. (158° F.), any extracted BHT vapors will precipitate in the second section. Since the cooling means is not part of a recycling circuit, BHT will not condense upon and thus not clog the cooling means. Instead BHT is filtered out of the recycled air mixture within the foam block itself.

TDI will also precipitate out of the cool mixed gasses in the second cooling step. The precipitated TDI is also filtered from the recycled air mixture and becomes trapped in the polyurethane block. This is ideal in that the TDI is returned to the block to undergo further cross-linking reactions. Thus, the recycling of cooling air in the second step of the present invention conserves costly TDI.

The second cooling step of the present invention accounts for the majority of block cooling as the chilled air mixture effectively reduces the block temperature to about 100° F.

In a third cooling step of the present invention, ambient air is once again drawn through the block. The ambient air is able to draw any remaining fumes away from the block and vent them into the atmosphere. During periods of high ambient humidity, the air utilized in the third step of the present invention may be dehumidified in order to prevent the air from incorporating additional water into the foam block. Block temperature during the third step generally remains at about 100° F.

The condensation of sublimates such as BHT and TDI takes place only within the second cooling step. Foam block internal temperatures during the first step is well above the sublimation point of BHT and TDI. Therefore, redeposition of sublimates within the block is not possible. The third step, discussed below, involves block temperatures well below the sublimation temperatures of BHT and TDI and therefore sublimates of these compounds are not present.

The internal block temperature of the foam block drops to a temperature of from about 90° to 110° F. at termination of the second cooling step. During the time the block is cooled in the enclosed tunnel, air is never recirculated through a recouperant unit or refrigerant coil in which BHT, TDI or other gas components may cause a blockage.

The first cooling step (fume extraction stage) of the present invention provides for a continuous venting of ambient air through the foam block. Since the method of the present invention may utilize a polyurethane formulation including a decreased percentage, or no auxiliary blowing agents, direct venting of the first stage of the enclosed tunnel does not place high concentrations of toxic agents such as chlorofluorocarbons or other volatile chlorine containing compounds into the environment. The vented gases therefore comply with all government requirements, such as the Clean Air Act, without requiring additional treatment.

Ambient air moving through the exothermically heated block in the first step removes excess moisture from the block which would otherwise interfere with free isocyanate groups needed to complete curing. Therefore the present method may utilize a polyurethane formulation having an increased percentage of water. The increased water content provides adequate foaming during initial urethane formation without necessitating auxiliary foaming agents. Additives such as softening agents may be utilized along with the so-called soft polyols to further obviate the use of auxiliary blowing agents.

The present invention is able to utilize a polyurethane formulation which includes less TDI while achieving substantially the same degree of cross-linking (and thus stiffness and hardness) in a polyurethane foam block as compared to prior methods. Therefore the present invention is economical in that less TDI (i.e., lower indexes) can be used.

The present invention includes an apparatus which is especially adapted and configured for practicing the above-described method. This apparatus comprises an enclosed tunnel and a conveyor means, such as a slat conveyor for transporting foam blocks through the enclosed tunnel.

The apparatus provides rapid cooling, degassing and dehumidifying of initially cured porous foam material while minimizing emission of pollutants. The apparatus includes a conveyor means for transporting porous foam material from a site of initial cure to and through an enclosed cooling tunnel. The tunnel utilizes ambient air and cooled ambient air to remove heat, moisture and volatile gasses from the foam material while simultaneously conserving and redepositing valuable sublimates back into the foam.

In the preferred embodiment, the enclosed tunnel includes a plurality of suction fans located outside and adjacent to the tunnel. The vacuum fans are connected to the tunnel by duct work. As the suction fans are actuated, air is drawn from the enclosed tunnel through the ductwork thereby forming a vacuum within the tunnel. The vacuum within the tunnel draws ambient air into the tunnel through openings located at opposite ends thereof. A cooling fan and chiller unit are also located outside and adjacent to the tunnel. The cooling fan directs ambient air through a cooling duct into the tunnel. Within the cooling duct, a cooling coil chilled by the chiller unit reduces the temperature of air passing through the duct into the tunnel.

A slat conveyor provides a conveyor means for moving polyurethane blocks through a first, second and third section of the enclosed tunnel wherein the blocks are sequentially defumed, cooled and further defumed again.

Figure 2:
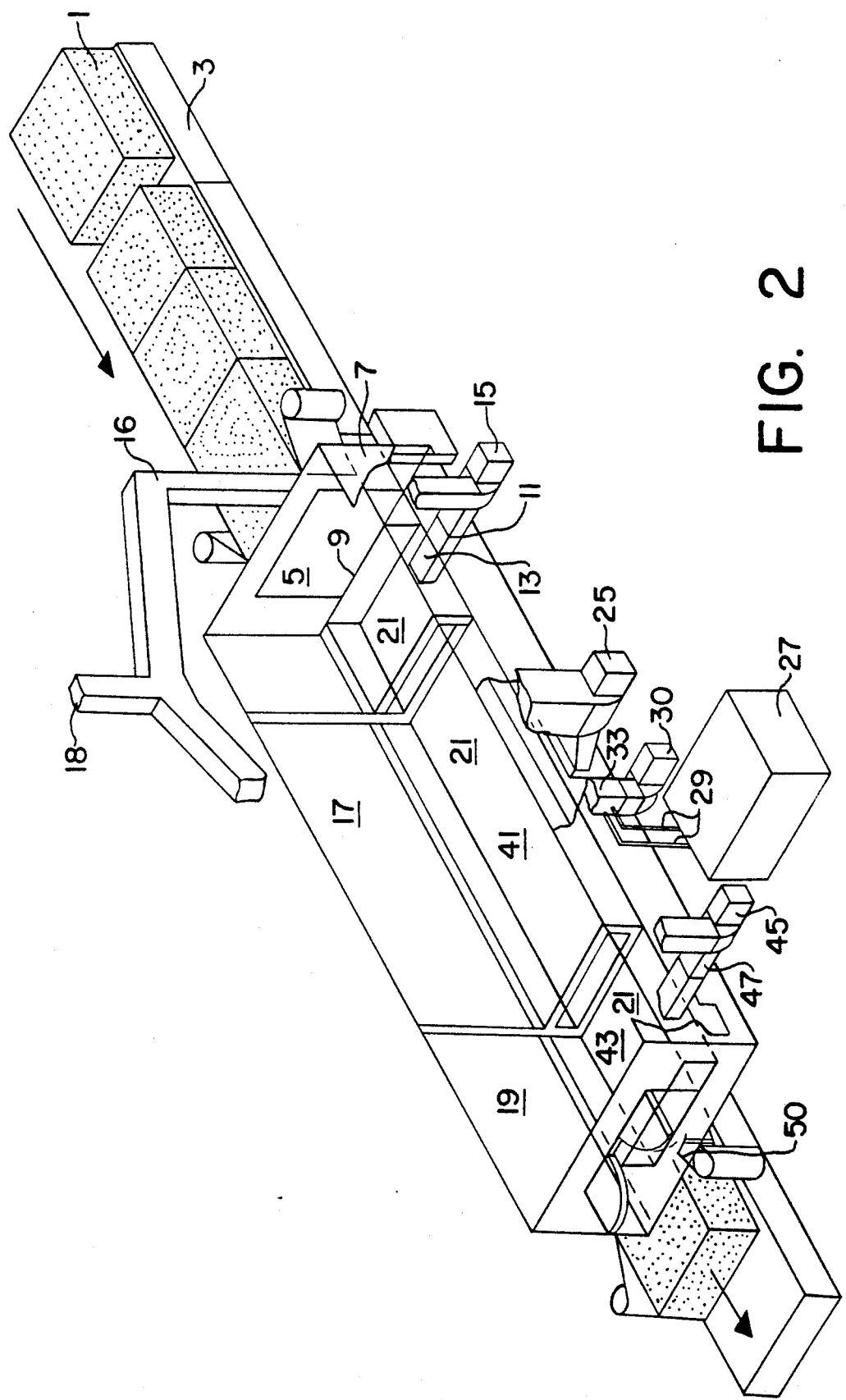
FIG. 2 is an internal view of the apparatus of FIG. 1.

FIGS. 1 and 2 illustrate one example of an apparatus especially adapted for practicing the method of the present invention. Blocks of polyurethane foam 1 are placed on a slat conveyor 3 which transports the blocks from a loading point to, and eventually through an entrance opening 5 located at one end of the enclosed tunnel 7. These blocks are generally loaded on the conveyor just after a peak in the time/temperature curve illustrating the exothermic formation reaction of the polyurethane. Delaying cooling until this point assures sufficient polymerization of the polyurethane occurs before a rapid cooling process will commence.

Conveyor 3 transports the blocks into an entrance opening 5 located at one end of the enclosed tunnel 7 wherein the block enters a first cooling (fume extraction) section 9 wherein the first step of the present method takes place.

Figure 2A:
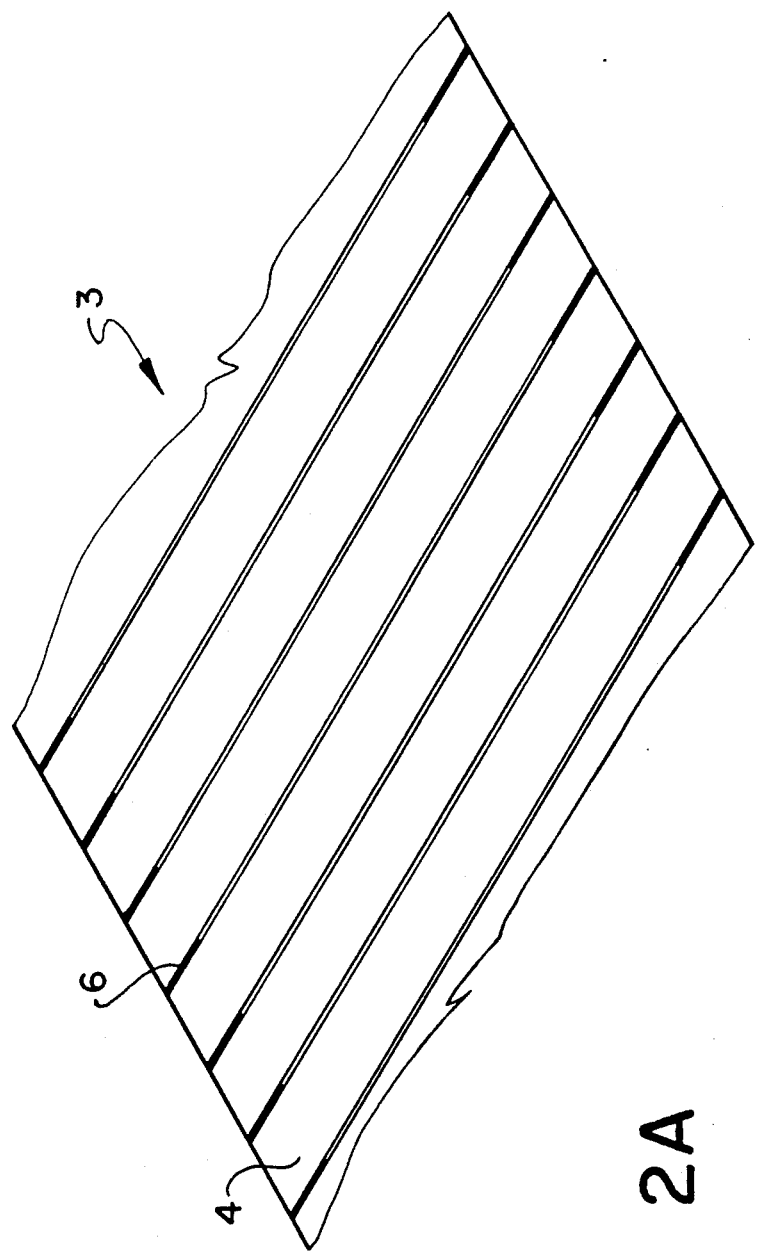
FIG. 2A is a partial top view of a slat conveyor for use in the apparatus of FIG. 1.
Figure 4:
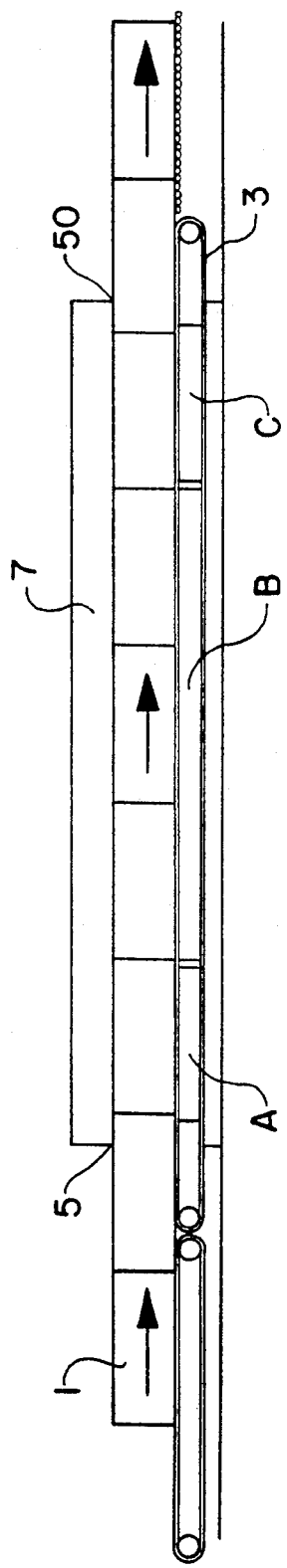
FIG. 4 is a side view of porous blocks located upon a conveyor passing through an enclosed tunnel utilized in one embodiment of the present invention (internal view of tunnel)
Figure 5:
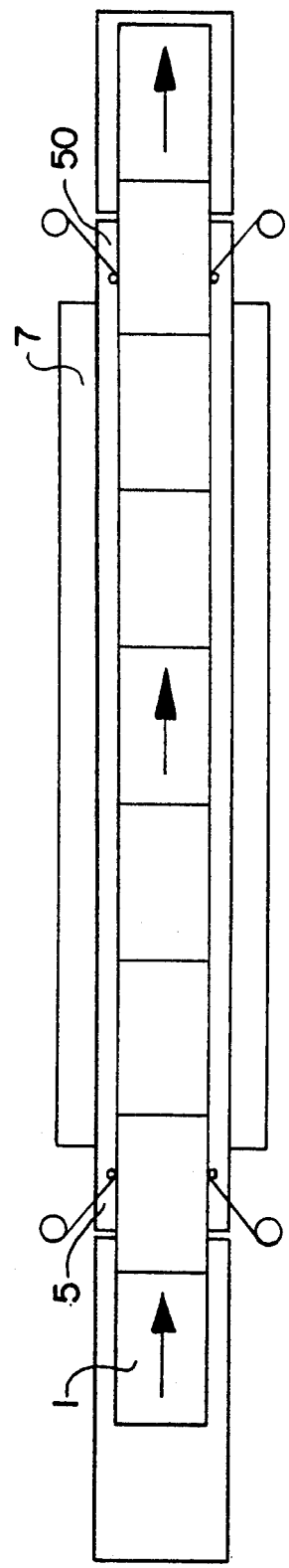
FIG. 5 is a top view of the conveyor of FIG. 4.

As shown in FIG. 2A, slat conveyor 3 includes a plurality of elongated rectangular members or slats 4, which are separated by a distance sufficient to allow gas to flow therebetween. The ends of the slats 4 are sealed by the use of gaskets 6, since the foam blocks do not cover the entire top surface of the slats 4. This arrangement causes cooling gas to be drawn through the foam blocks.

Typical conveyor dimensions for 2 meter amide blocks are about 2.3 m (90 inches) in width with each gasket extending inwardly about 250 cm (10") from each side of the conveyor. The gaskets have a width sufficient to provide gas sealing properties when the slats are spaced at a distance of about 3 mm (⅛").

A first suction fan 15 is located outside and adjacent to the first section of the enclosed tunnel. The first suction fan removes air from a first suction box 21 (that occupies a lower portion of the first section below the slat conveyor), by means of a first vacuum duct 13. The duct forms an air conduit from the fan which passes through an opening 11 in a side wall of the first section of the enclosed tunnel below the slat conveyor. Thus a vacuum is formed within the first vacuum box.

Plastic side films are fed into the tunnel with the blocks to create a side seal so that the path of the recirculating air through the blocks does not short circuit through the sides. As the slat conveyor transports a block into the first cooling section, the vacuum created by the first vacuum fan 15 in the vacuum box draws ambient air from the upper portion of the enclosed tunnel and then through the porous block. The ambient air is thereafter drawn into the first vacuum box 21 from which it is removed, through the first suction fan via the first vacuum duct 13.

When the porous polyurethane block is initially conveyed into the first section, the exothermic curing process results in block internal temperature ranges of about 250° to 500° F., and usually from 370° to 400° F. As discussed above, at these temperatures, various components of the foam are present in the gaseous state. In addition, at these elevated temperatures, excess water remaining after initial foaming and curing of the polyurethane is present as water vapor. Ambient air passing through the block during the first cooling stage vents the gaseous materials and water vapor from the block, while at the same time, reducing the temperature of the block.

From the first vacuum box, ambient air now heated and transporting a mixture of gasses and water vapor is drawn through the first vacuum duct 13 by the first suction fan 15 and thereafter vented through a first emission duct 16. The first emission duct conducts the heated mixture to an emission point 18 located above the enclosed tunnel through which the heated mixture of air, vapors, moisture and sublimates exit the apparatus.

The temperature of the emitted gas mixture ranges from about 160° to 180° F. Since the first section removes water from the polyurethane block, free-end isocyanate termination by excess water is reduced.

As the block is conveyed further into the enclosed tunnel by the slat conveyor, it enters a second cooling section 17. A second suction fan 25 is located adjacent and outside the second section of the tunnel. Adjacent to the second suction fan, a cooling fan 30 is located. A chiller unit 27 adjacent the cooling fan contains a heat exchanger which is utilized to reduce the temperature of cooling coils located in cooling duct 33. Coolant pipes 29 enter cooling duct 33 so as to provide a means for the heat exchanger to remove heat from the cooling coils.

During operation of the second cooling section of the enclosed tunnel, the cooling fan 30 draws ambient air into cooling duct 33 through which the air is conducted into a side of the second section of the enclosed tunnel at a level above that of the slat conveyor. As air passes through duct 33, cooling coils located therein (not shown) cooled via coolant pipes 29 reduce the temperature of the ambient air. The cool ambient air entering the second section is drawn through polyurethane blocks located on a portion of the conveyor positioned therein by means of a vacuum created (below the level of the conveyor), in a second vacuum box 21 located therein. The vacuum of the vacuum box is provided by the second suction fan which evacuates air from the second vacuum box into a second vacuum duct 37. From the second suction duct 37, the second suction fan forces the air into return duct 35 which empties into an upper portion of the second section above the porous blocks therein.

Figure 6:
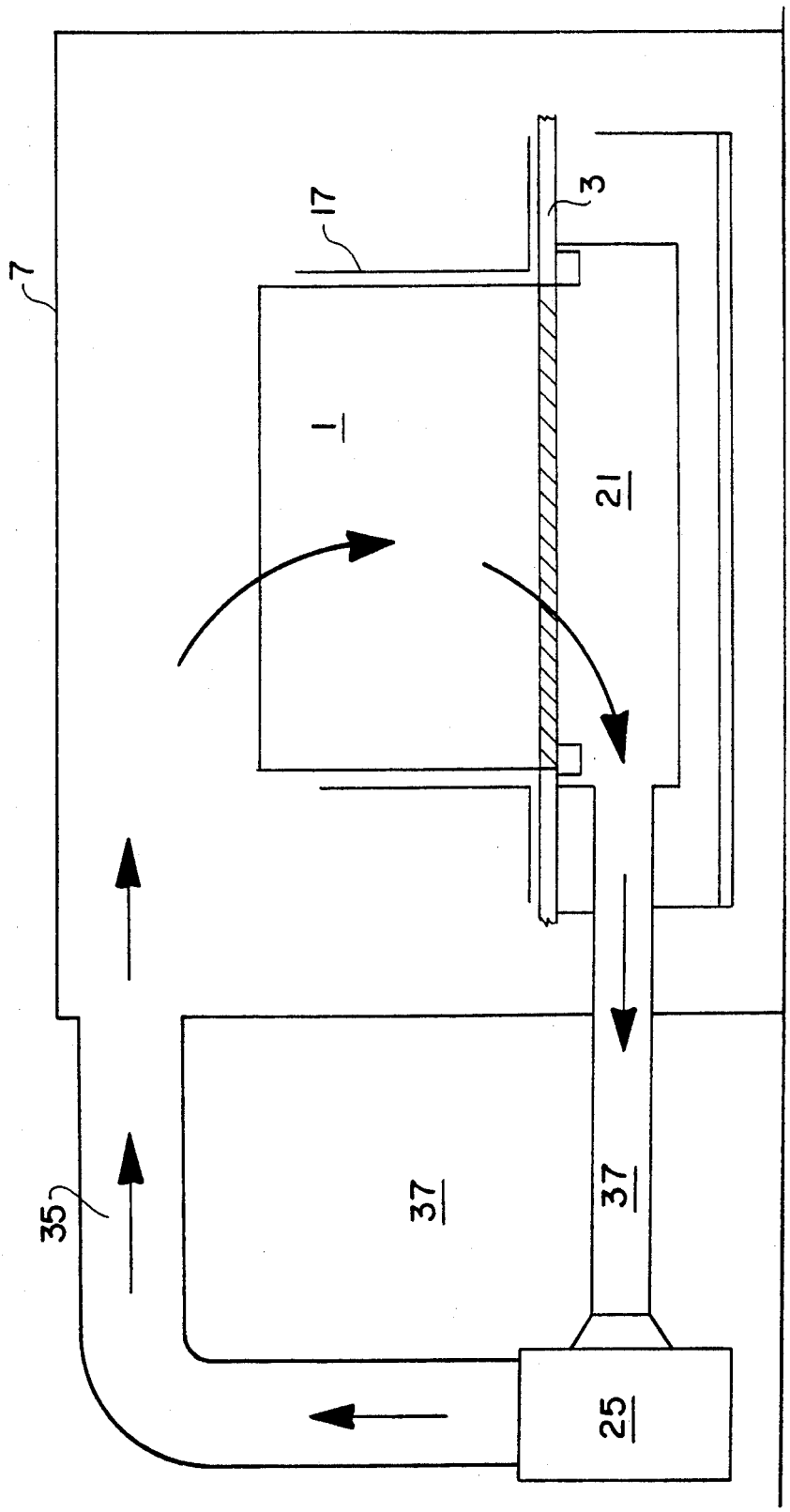
FIG. 6 is a cross-sectional view of the second section of an enclosed tunnel illustrating the recycling of cooling gas.

FIG. 6 shows an internal view of the second section of the apparatus of the present invention. The second vacuum box 21 located under the conveyor 3 is evacuated by means of the second suction fan 25 drawing air out from the box through second vacuum duct 37. Cooled ambient air supplied by cooling fan 30 supplies fresh reduced temperature air to the second section as shown in FIGS. 1 and 2. Once the cooled air enters the second section, it is recirculated through polyurethane foam blocks located therein and into the vacuum box positioned under the conveyor.

As illustrated by the arrows in FIG. 6, once the cooled air enters the second section, a recirculation occurs. The air passing into the second vacuum box is drawn by the second suction fan 25 through the second vacuum duct 37. The air is then returned to the upper portion of the second section of the enclosed tunnel through return duct 35.

Thus, the second section of the apparatus provides for the recycling of cooled air through the polyurethane foam blocks in accordance with the second step of the method of the present invention.

Polyurethane blocks conveyed through the second section exhibit temperatures beyond the sublimation temperature of various components of the polyurethane such as BHT and TDI. Since coolant air is recycled by the second suction fan and ducts 35 and 37, no venting and thus no loss of such sublimates occur in the second section. The cooled air introduced into the second section by the cooling fan 30 and the cooling coils is comprised of fresh ambient air. Since there is no recycling of air through duct 33, clogging of the cooling coils by BHT, TDI or other sublimates is avoided.

As air is recycled through the polyurethane block in the second section of the enclosed tunnel, it removes heat and sublimates contained therein. The heated recycled air is mixed with cooled ambient air so as to decrease its temperature. As the temperature of the recycled air decreases, condensation of sublimates occurs within the foam block. Deposition of TDI within the polyurethane block provides for increased cross-linking and thus greater hardness and stiffness in the polyurethane block. The temperature of the recycled air ranges from about 100° to 160° F.

After the porous block is conveyed through the second section of the enclosed tunnel, it enters the third cooling (fume extraction) section 19 which is located between the second section and an exit opening of the enclosed tunnel. Adjacent and outside of the third section a third suction fan 45 is located. The third suction fan 45 draws air from a third vacuum box 43 located in a lower portion of the third section of the enclosed tunnel below the level of the slat conveyor by means of an air conduit formed by the third vacuum duct 47. Thus, a vacuum is formed within the third vacuum box.

The suction created in the third suction box draws ambient air through the exit opening located at an end of the enclosed tunnel opposite the entrance opening end. The ambient air is then drawn through foam block positioned on a portion of the conveyor located in the third section removing additional heat and sublimates therefrom.

Air drawn through blocks positioned in the third section are conveyed through a third vacuum duct 47 to a second emission duct 49. As in the first section, heated air containing sublimates is vented to emission point 18 rather than being recycled.

FIGS. 3a and 3b schematically compare different emissions resulting from utilizing polyurethane formulations with little or no auxiliary foaming agents and conventional formulations containing a substantial amount of these agents.

FIG. 3b schematically represents the process of the present invention applied to a polyurethane formulation having little or no auxiliary blowing agents. Figure Block 57 represents a polyurethane formulation especially adapted for use with the method of the present invention in which little or no auxiliary blowing agents are used. During foam block formation, such as in a vertical foam square machine as represented by block 61, suction fans 63 vent gases 67 resulting from the polyurethane forming reaction. Since the formulation 57 contains little or no auxiliary blowing agents such as chlorofluorocarbons, emission 67 will not include a substantial amount of these pollutants.

Block 69 represents the rapid cooling process of the present invention wherein gas extraction provided by suction fans 64 vent gases containing little or none of the above discussed pollutants. Block 71 represents foam cure areas after rapid cooling. Final polyurethane foam blocks represented by box 85 exhibit hardness and stiffness equivalent to that provided by conventional polyurethane formulations utilizing a significant amount of auxiliary foaming agents. Thus these reduced blowing agent formulations result in decreased pollution during foam manufacture while yielding polyurethane products exhibiting excellent physical properties.

FIG. 3a schematically represents conventional processing of polyurethane formulations having a substantial amount of auxiliary blowing agent. Block 55 represents a conventional polyurethane foam formulation including a significant amount of auxiliary foaming agent. As the polyurethane blocks are initially cured in the vertical foam square machine represented by block 59, gas by-products are extracted by suction fans 66 resulting in emissions 65. Since the polyurethane formulation represented in FIG. 3a includes a significant amount of auxiliary blowing agent, a substantial amount of pollutant, such as chlorofluorocarbons, will be generated at this stage of polyurethane foam block manufacture. Block 72 represents a conventional slow curing process. Suction fans 68 remove volatile gasses generated during the slow curing which, as during the initial foam curing process, will contain a significant amount of pollutants derived from the auxiliary blowing agents.

Figure 7:
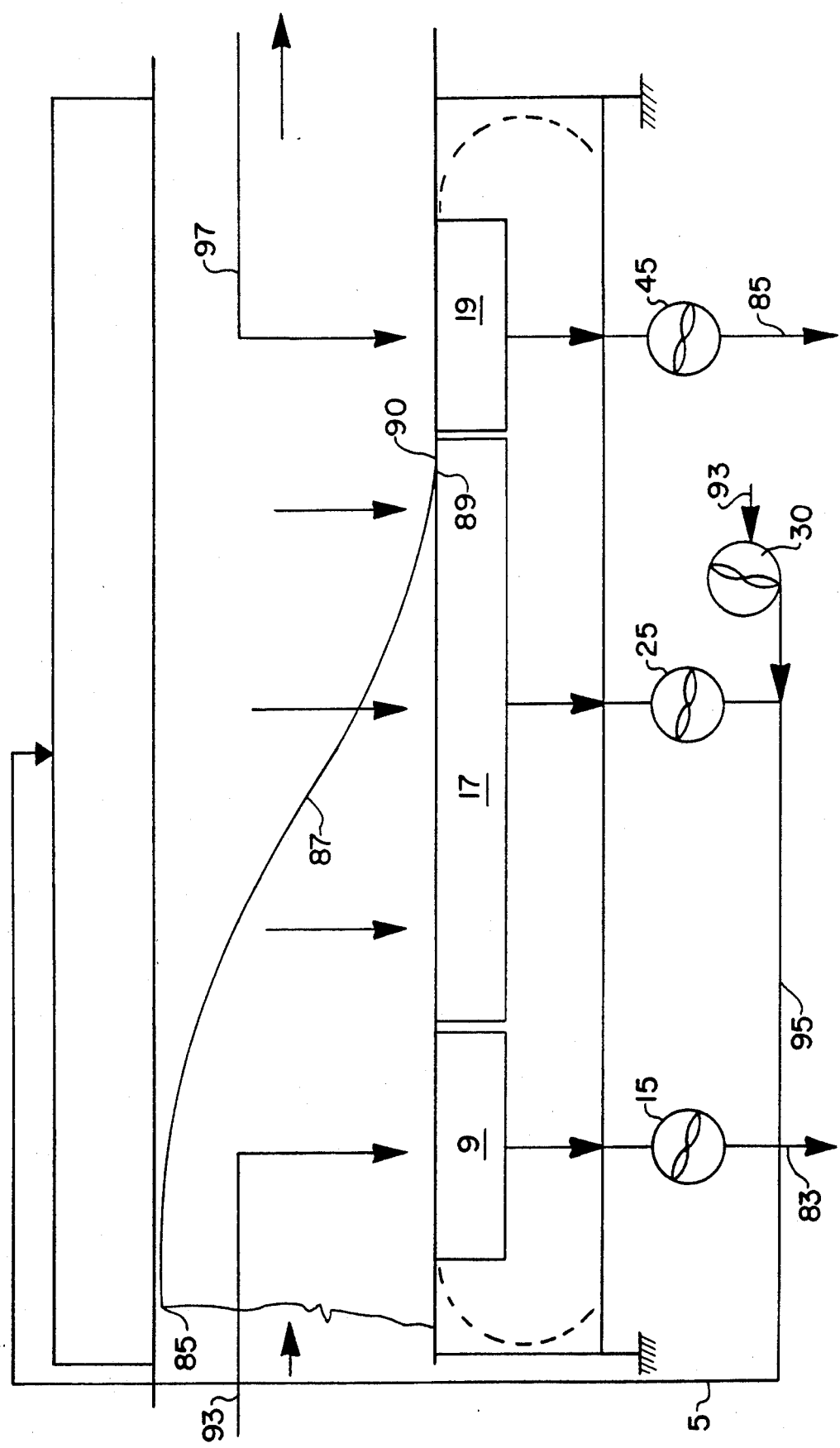
FIG. 7 is a schematic drawing illustrating the temperature gradients and air paths within the enclosed tunnel.

FIG. 7 schematically illustrates the air current paths utilized in the cooling process of the present invention as well as a graph depicting the decrease in polyurethane block temperature during the process.

Block 9 represents the first section of the apparatus of the present invention in which ambient air 93 is drawn through the polyurethane block by first suction fan 15 and then vented at emission point 83. Typically, the average temperature of vented gasses at this point range from 155° to 185° F.

Circuit 95 illustrates the air circulation path occurring in the second section 17 of the apparatus of the present invention. Fresh ambient air 93 drawn into the enclosed tunnel by cooling fan 30 is constantly mixed with air which has been drawn through porous blocks located in the second section by the second suction fan 25. As the fresh cool air mixes with air drawn through the block, a cooled mixture is returned to the top of the second section for continuous recycling through the block. The temperature of the cooled air mixture returning to the top of the second section ranges from between 100° and 160° F.

Circuit 97 represents air flow in the third section. Air from an upper portion of the tunnel is pulled through a foam block by the third suction fan 487 5 and out emission duct 85. The temperature of the gas removed from the third section is typically about 100° F.

Graph 87 incorporated within the schematic diagram illustrated in FIG. 7 represents the declining internal block temperature of a polyurethane block cooled in accordance with the method of the present invention. The initial peak temperature at point 85 ranges from about 370° to 400° F. and decreases to about 100° F. at point 90 by the beginning of the third step of the process. The time period required for rapid cooling of a polyurethane foam block utilizing the apparatus and method of the present invention ranges from about 8 to 18 minutes.

Figure 8:
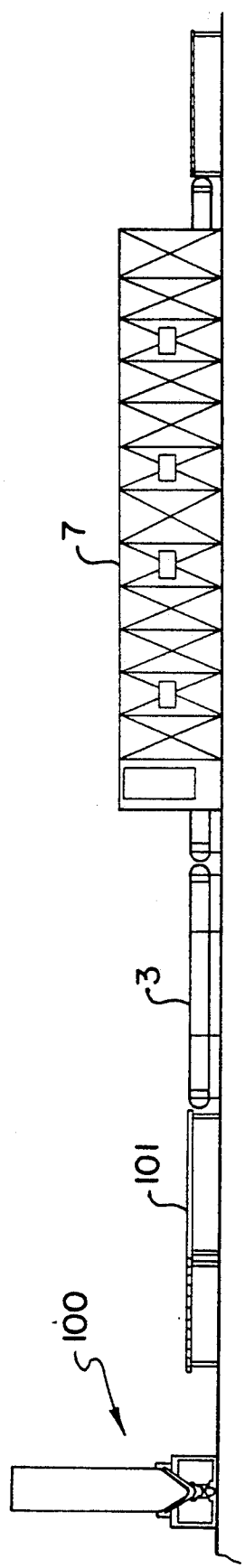
FIG. 8 is a side view of a vertical foam block apparatus positioned adjacent and supplying blocks to the apparatus of FIG. 1.

In FIG. 8, a vertical polyurethane foam block forming apparatus 100 is shown located adjacent the apparatus of the present invention. A roller conveyor 101 receives blocks from the vertical apparatus after a short holding time and transports them to the slat conveyor 3 for introduction into the enclosed tunnel 7 for rapid curing.

It has been found that an initial holding time of between about 5 minutes and one hour is beneficial, with 10 to 30 minutes being optimum. This initial holding time subjects the blocks to cooling only after developing sufficient properties to withstand the cooling process without shape distortion or deterioration.

It is also possible to cure round block foam by the present invention. These round blocks are cut to an appropriate length and are placed with the cut side facing the slat conveyor. Of course, the entrance to the tunnel must be sufficient in width to accommodate the diameter of the block, and in height to accommodate the length of the block. Also, a form or template is advantageously placed upon the slat conveyor 3 so that all cooling air is forced to pass through the foam block. Otherwise, the round blocks pass through the tunnel and are treated in the same manner as the rectangular blocks.

The method of the present invention allows the use of a polyurethane formulation especially adapted for practicing the method. The polyurethane formulation of the present invention comprises a polyether polyurethane, an organic diisocyanate, water at least one softening agent. A higher percentage of water and a decreased amount of auxiliary blowing agent (as compared to prior art polyurethane foam formulations), is advantageously utilized. These formulations may incorporate either diminished amounts of or no auxiliary foaming agents while producing urethane foam blocks exhibiting excellent smoothness, softness, and strength while decreasing the emission of toxic pollutant chlorofluorocarbons.

The term "polyether polyol" as used throughout this application includes poly (oxytetramethylene) glycols which are prepared by the polymerization of tetrahydrofuran. Poly(oxypropylene) triols are another important group of polyethers used in this class. These triols are prepared by the same general reactions as poly (oxypropylene) glycols.

The most preferred polyols for practicing the present invention include Thanol F-3020 as the 3000 m.w. polyether polyol, and Thanol F-1500 as the 1500 m.w. polyether polyol, both of which are manufactured by Arco Chemical. These were utilized in the examples as the basic polyol and soft polyol, respectively.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, hexamethylene diisocyanate, tetramethylene diisocyanate, mixtures of 2,4 toluene and 2,6-toluene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-iisocyanate, 4,4'-diphenylmethane diisocyanate, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-biphenyl diisocyanate; the triisocyanates such as 4,4',4''-triphenylmethane triisocyanate, and toluene 2,4,6-triisocyanate; and the tetraisocyanates such as 4,4''-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Although formulations containing a higher percentage of water advantageously increase foaming, water, as discussed above, reacts with isocyate groups to form ureas. These amide terminated compounds tend to agglomerate in polyurethane foam products reducing softness and smoothness. Although the method of the present invention removes much of the excess water remaining in the polyurethane after initial foaming, some excess water does remain in the foam during the cooling process.

By utilizing a mixture of two different polyols in a polyurethane formulation especially adapted for the method of the present invention, formation of amide terminated isocyanates may be controlled. The mixture is comprised of a basic polyol having a molecular weight of at least about 2,500 to 4,000, preferably about 3,000, with a soft polyol with a molecular weight of from about 1200 to 1800, and preferably about 1500. The hydroxyl functionality of the basic polyol is between about 30 to 80, preferably about 56, while the functionality of the soft polyol is between about 90 and 150, preferably about 112.

By incorporating a soft polyol with an increased hydroxyl functionality within the polyurethane formulation, an increased hydroxyl to water ratio is created. Therefore, more hydroxyl groups are available to non-competitively compete with the excess water for reaction with isocyanate groups. This results in the formation of fewer amides and greater cross-linking of the polyurethane foam product.

Amide formation, as discussed above, decreases smoothness and softness of a polyurethane foam product. Soft polyol utilize in a polyurethane formulation especially adapted for the present method, greatly reduces amide formation. However, even a reduced amount of amide terminated diisocyanate compounds may unfavorably effect polyurethane texture if allowed to agglomerate.

A sodium salt of polyacrylic acid is advantageously utilized in the above-discussed formulation as a dispersant electrolyte effectively preventing such agglomeration. By incorporating both soft polyol and the dispersant in the polyurethane formulation, only a small quantity of well dispersed amide terminated diisocyanates will form in the final polyurethane foam product produced in accordance with the present method. This amount ranges from about 0.1 to 1 weight percent of the formulation, preferably about 0.3 to 0.7 weight percent.

Other additives for forming the foam which may be incorporated into these form foaming compositions are well known to those skilled in the art, and would include, for example, catalysts, chain extending agents, surfactants or surface active agents, and/or flame retardant additives.

Suitable flame retardants for use in the composition of the invention include those which are conventionally used in the art of making flexible, flame retardant polyurethane foams, such as triesters of phosphoric acid, halogenated triesters of phosphoric acid, halogenated hydrocarbons, and the like.

EXAMPLE 1

Table I lists the components of a polyurethane formulation of the prior art (Old-1) and two polyurethane compositions (New-1 and New-2) especially formulated for use in the method of the present invention.

TABLE I

Foam Formulation for Low Indentation Load Deflection and Low Density

| CHEMICAL COMPONENTS | PARTS BY WEIGHT | | |
|---|---|---|---|
| | OLD | NEW-1 | NEW-2 |
| Basic Polyol | 100 | 80 | 100 |
| Toluene Diisocyanate 80/20 | 54.028 | 56.436 | 65.100 |
| Water | 4.255 | 4.704 | 5.450 |
| Methylene Chloride | 20.017 | 15.529 | 7.503 |
| Silicone Surfactant DC 5160 | 1.4 | 1.304 | 1.3 |
| Tin Catalyst | 0.412 | 0.341 | 0.285 |
| Amine 33-LV | 0.033 | 0.071 | 0.074 |
| Soft Polyol | 0 | 20 | 0 |
| Carapor 2001 | 0 | 0 | 0 |
| TDI Index (%) | 108 | 101 | 98 |

As can be seen from Table I, the parts by weight of water in the new formulations (4.707 and 5.450), are greater than that utilized in the old formulation (4.255). As explained above, the incorporation of a greater amount of water in the polyurethane formulation utilized with the method of the present invention allows for greater foaming, but has previously been limited due to isocyanate termination caused by excess water.

Methylene chloride, an auxiliary foaming agent, is present in substantially reduced amounts in the two new formulations as compared to the old formulation (Old-1). The reduced amount of auxiliary blowing agent does not deleteriously affect the degree of polyurethane foaming, since a greater percentage of water is included in the new formulations.

The first new formulation (New 1) includes 80 parts basic polyol and 20 parts soft polyol. The basic polyol refers to a polyol with a molecular weight of about 3,000 whereas the soft polyol has a molecular weight of about 1500. The increased availability of hydroxyl groups on the soft polyol provide additional cross-linking sites for the isocyanate groups of diisocyanates used in the formulation. Although New formula 1 and 2 utilize a greater percentage of water, hardening of the foam material through formation of an excess number of amide groups (resulting from termination of isocyate groups by water) does not occur. The soft polyol acts to non-competitively bind isocyanate groups that would otherwise react with the water thereby providing a softer foam product.

Carapor 2001 is a softening agent comprising a sodium salt of polyacrylic acid. Since the new formulations utilize a greater amount of water, some increase in the amount of amide diisocyanate formed as a result will occur. In order to prevent these amide terminated diisocyanate groups from increasing the hardness of the foam product, Carapor is added to the formulations as a dispersant which prevents agglomeration of these groups.

The TDI index, a ratio of isocyanate groups theoretically available in the starting formula for reaction with polyol hydroxyl groups demonstrates the efficiency of the method of the present invention. Table I lists a TDI index for Old-1 as being 108, or 108 isocyanate groups for every 100 hydroxyl groups with which they can react. This TDI index indicates that an excess of available isocyanate groups was required in past polyurethane foam formulations because of the loss of a substantial amount of TDI as a sublimate during exothermic curing. The two new polyurethane compositions listed in Table I exhibit a lower TDI index. Yet, these new formulation provide an adequate amount of isocyanate groups to complete cross-linking of the polyurethane when cured according to the method of the present invention. Thus, these new formulations utilize a decreased amount of expensive TDI, while the resultant foam products demonstrate stiffness and harnesses which are equivalent to those provided by foam products made from the old formulation.

Table II lists various physical property results for the low density/low indentation polyurethane foam formulations of Table I. The physical property results were obtained from the three polyurethanes represented in Table I after first being subjected to initial curing and then the rapid curing method of the present invention. Actual testing took place approximately 24 hours after completion of rapid cure. As shown in Table II, tear strength, tensile strength and indentation load deflection (all indicative of the degree of cross-linking achieved in the polyurethane), of the old formulation and New-1 are substantially equivalent. This is surprising in that the TDI index for New-1 was about 6% lower than that of the old formulation. Furthermore, although the New-2 formulation demonstrated a significant decrease in tensile strength, its indentation load deflection as well as its tear strength were substantially the same as the other two formulations.

TABLE II

Physical Property Result for Low Density and Low Indentation Load Deflection

| 24 HOURS AFTER TYPE OF TESTING | | PROCESS | | |
|---|---|---|---|---|
| | | OLD | NEW-1 | NEW-2 |
| 1. | Sample Density (Lbs/Ft$^3$) | | | |
| | Top of Block | 0.85 | 0.93 | 0.93 |
| | Middle of Block | 0.85 | 0.89 | 0.92 |
| | Bottom of Block | 0.85 | 0.90 | 0.94 |
| | *Average Density | 0.85 | 0.91 | 0.93 |
| 2. | Indentation Load Deflection, Lb | | | |
| | Top of Block | 14.6 | 15.1 | 13.9 |
| | Middle of Block | 13.5 | 16.0 | 14.3 |
| | Bottom of Block | 14.7 | 15.0 | 14.6 |
| | *Average Density | 14.3 | 15.4 | 14.3 |
| 3. | Support Factor | | | |
| | Top of Block | 1.86 | 2.09 | 2.06 |
| | Middle of Block | 1.94 | 1.98 | 2.08 |
| | Bottom of Block | 1.88 | 2.08 | 2.04 |
| | *Average Density | 1.89 | 2.05 | 2.06 |
| 4. | Hysteresis (in %) | | | |
| | Top of Block | 70.5 | 63.9 | 58.3 |
| | Middle of Block | 71.1 | 63.2 | 58.8 |
| | Bottom of Block | 71.4 | 64.3 | 60.4 |
| | *Average Density | 71.0 | 63.8 | 59.2 |
| 5. | 90% Compression Set (in %) | | | |
| | Top of Block | 35.6 | 15.5 | 10.5 |
| | Middle of Block | 33.1 | 13.5 | 13.4 |
| | Bottom of Block | 37.9 | 16.8 | 12.9 |
| | *Average Density | 35.5 | 15.3 | 12.3 |
| 6. | Porosity (Ft$^3$/Min) | | | |
| | Top of Block | 5.67 | 4.64 | 5.12 |
| | Middle of Block | 6.77 | 5.23 | 5.36 |
| | Bottom of Block | 5.93 | 4.72 | 5.44 |
| | *Average Density | 6.12 | 2.86 | 5.31 |
| 7. | Tensile Strength (Lb/in$^2$) | | | |
| | Top of Block | 10.2 | 10.3 | 8.74 |
| | Middle of Block | 11.2 | 11.2 | 9.83 |
| | Bottom of Block | 13.0 | 11.0 | 9.41 |
| | *Average Density | 11.5 | 10.8 | 9.32 |
| 8. | Elongation (in %) | | | |
| | Top of Block | 175 | 150 | 125 |
| | Middle of Block | 200 | 217 | 125 |
| | Bottom of Block | 225 | 192 | 125 |
| | *Average Density | 200 | 186 | 125 |
| 9. | Tear Strength (Lb/in) | | | |
| | Top of Block | 2.15 | 2.36 | 2.12 |
| | Middle of Block | 2.35 | 2.38 | 2.36 |
| | Bottom of Block | 2.40 | 2.35 | 2.14 |
| | *Average Density | 2.30 | 2.36 | 2.21 |
| 10. | Resiliency (inches) | | | |
| | Top of Block | 30 | 29 | 36 |
| | Middle of Block | 29 | 26 | 37 |
| | Bottom of Block | 32 | 37 | 36 |
| | *Average Density | 30 | 34 | 36 |
| 11. | Height lost of Block (in %) | 2.2 | 2.2 | 2.2 |
| 12. | Potential for Discoloration | NONE | NONE | NONE |
| 13. | Maximum Exothermic (°F.) | 285.3 | 304.3 | 344.2 |
| 14. | Minimum Exothermic (°F.) | 113.6 | 106.0 | 80.5 |
| 15. | Time Remove Internal Heat, MIN | 10 | 10 | 10 |

Surprisingly, the percentage of elongation of the New-2 formulation was the lowest indicating a greater degree of cross-linking then would be expected in the formulation with the lowest TDI index.

Sample density and porosity (both indicative of the efficiency of the foaming reaction), indicate that even without utilizing any auxiliary foaming agent, only a minor decrease in foaming occurred.

FIG. 8 is a time/temperature graph illustrating the rapid curing of the old formulation listed in Table I according to the method of the present invention. The conveyor speed in the enclosed tunnel was approximately 3.63 feet/minute. Ambient temperature during rapid cooling was 87° F. at a relative humidity of 38%. The tunnel temperature was 115° F. Twelve minutes were required to cool the foam.

Figure 9:
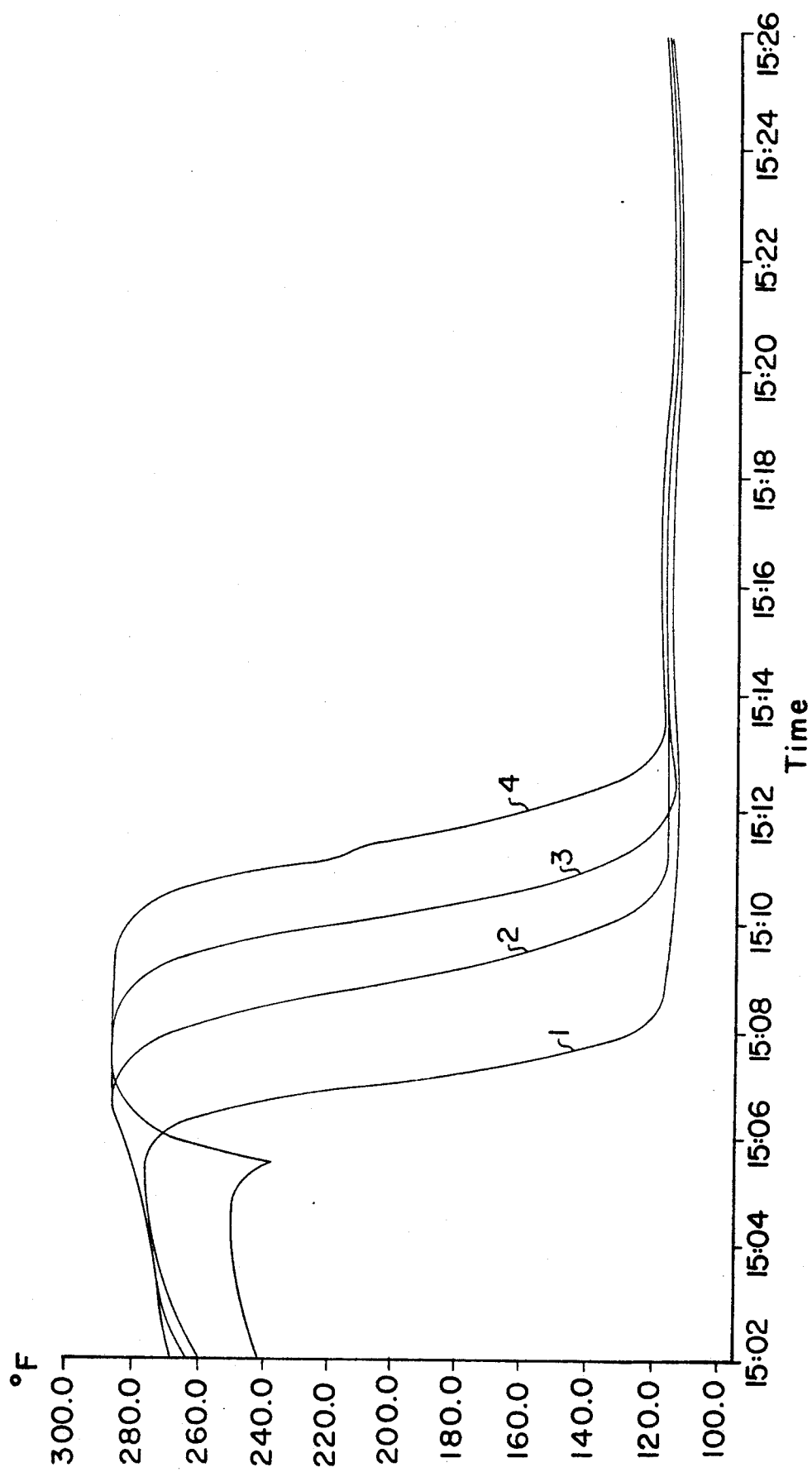
FIGS. 9 to 19 are graphical illustrations of temperature vs time for cooling of various polyurethane foam blocks.

FIG. 9 is a time/temperature graph illustrating the rapid curing of the formulation listed as New-1 in Table I especially formulated for the method of the present invention. Conveyor speed was 3.62 feet/minute. The ambient temperature was 71° F. at a relative humidity of 49%. The tunnel temperature was 118° F. at a relative humidity of 28%. The cold air temperature was 36° F. Fifteen minutes were required to cool the foam.

Figure 10:
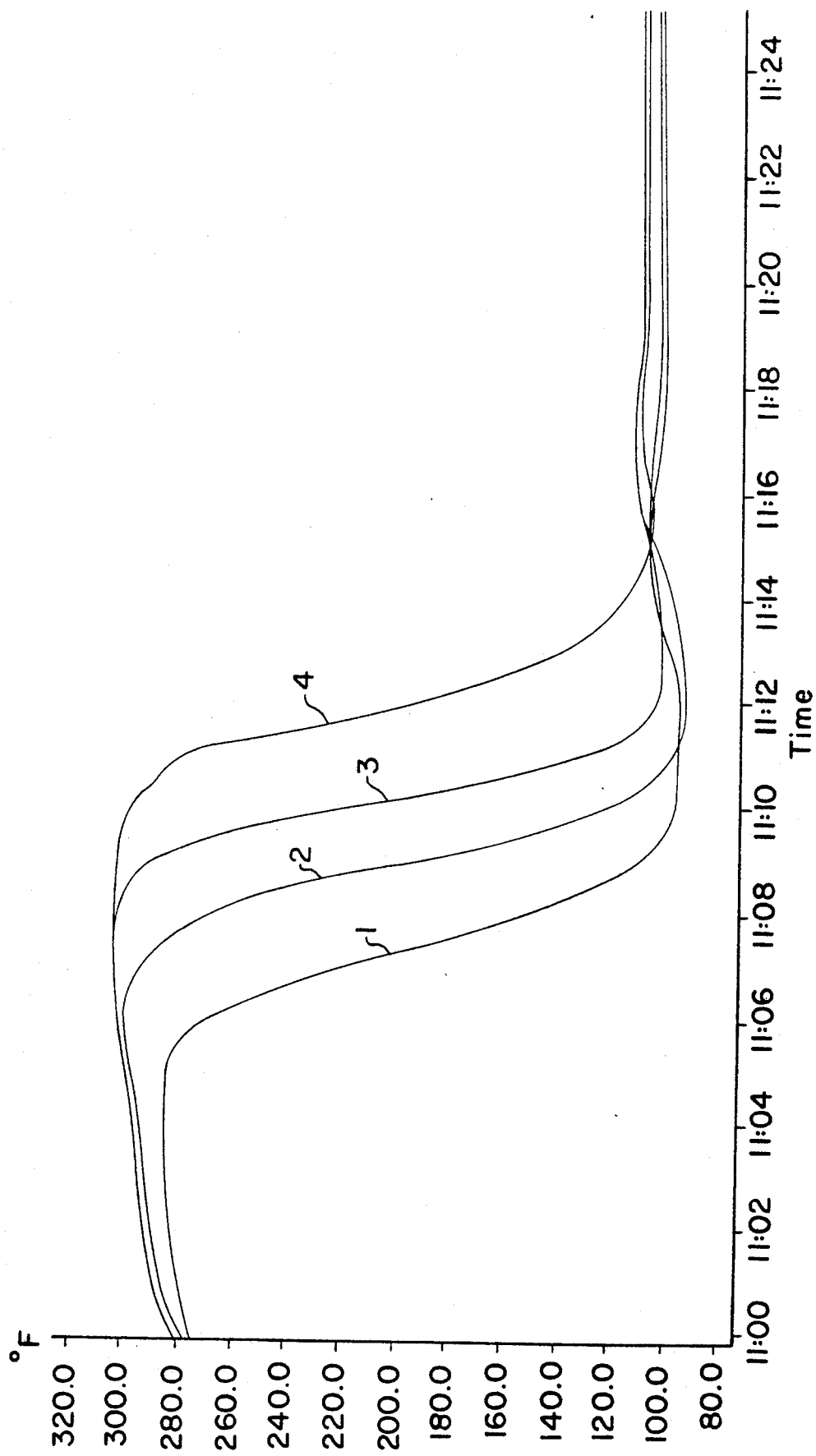

FIG. 10 is a time/temperature graph illustrating the rapid curing of the formulation listed as New-2 in Table I especially formulated for the method of the present invention. Slat conveyor speed was 3.88 feet/minute. The ambient temperature was 75° F. at a relative humidity of 49%. The tunnel temperature was 118° F. at a relative humidity of 28%. The cool ambient air temperature was 36° F.

EXAMPLE 2

Table III lists the components of a low density/high indentation load deflection polyurethane formulation of the prior art (Old-2) and two polyurethane compositions (New-3 and New-4) especially formulated for use in the method of the present invention.

TABLE III

Foam Formulation for High Indentation Load Deflection and Low Density

| CHEMICAL COMPONENTS | PARTS BY WEIGHT | | |
|---|---|---|---|
| | OLD-2 | NEW-3 | NEW-4 |
| Basic Polyol | 100 | 100 | 100 |
| Toluene Diisocyanate 80/20 | 77.410 | 75.336 | 83.450 |
| Water | 6.012 | 6.453 | 7.400 |
| Methylene Chloride | 8.768 | 5.020 | 0 |
| Silicone Surfactant DC 5160 | 1.005 | 1.098 | 1.000 |
| Tin Catalyst | 0.271 | 0.205 | 0.190 |
| Amine 33-LV | 0.080 | 0.079 | 0.080 |
| Soft Polyol | 0 | 0 | 0 |
| Carapor 2001 | 0 | 0 | 0.4 |
| TDI Index (%) | 118 | 110 | 104 |

As can be seen from Table III, the parts by weight of water in the new formulations (6.453 and 7.400), are greater than that utilized in the old formulation (6.012). Methylene chloride, an auxiliary foaming agent is present (parts per weight), in either a reduced amount or absent in the two new formulations (5.020 and 0) as compared to the old formulation (8.768). This reduced amount of agent in the new formulations does not deleteriously affect the degree of polyurethane foaming (as discussed below), since a greater percentage of water in the new formulations provides adequate foaming.

Table III lists a TDI index for the Old-2 formulation as being 118, or 118 isocyanate groups for every 100 hydroxyl groups with which they can react. The two formulations New-3 and New-4 especially adapted for use in the method of the present invention exhibit a decreased TDI index of 110 and 104 respectively. Yet, as discussed below, these new formulations still exhibit satisfactory cross linking.

Table IV lists various physical property results for the low density/high indentation load deflection polyurethane foam formulations described in Table III. The physical property results were obtained from the three polyurethanes represented in Table I after first being subjected to initial curing and then the rapid curing method of the present invention. Actual testing took place approximately 24 hours after completion of rapid cure.

TABLE IV

Physical Property Result for Low Density and Low Indentation Load Deflection

| | 24 HOURS AFTER TYPE OF TESTING | PROCESS | | |
|---|---|---|---|---|
| | | OLD-2 | NEW-3 | NEW-4 |
| 1. | Sample Density (Lbs/Ft$^3$) | | | |
| | Top of Block | 0.88 | 0.92 | 0.93 |
| | Middle of Block | 0.88 | 0.90 | 0.92 |
| | Bottom of Block | 0.87 | 0.92 | 0.96 |
| | *Average Density | 0.88 | 0.91 | 0.94 |
| 2. | Indentation Load Deflection, Lb | | | |
| | Top of Block | 26.0 | 26.9 | 29.8 |
| | Middle of Block | 25.2 | 24.7 | 27.4 |
| | Bottom of Block | 26.5 | 23.6 | 27.0 |
| | *Average Density | 25.9 | 25.1 | 28.1 |
| 3. | Support Factor | | | |
| | Top of Block | 2.00 | 2.07 | 2.18 |
| | Middle of Block | 1.93 | 2.17 | 2.17 |
| | Bottom of Block | 1.98 | 2.04 | 2.23 |
| | *Average Density | 1.97 | 2.09 | 2.19 |
| 4. | Hysteresis (in %) | | | |
| | Top of Block | 62.7 | 57.0 | 55.3 |
| | Middle of Block | 56.7 | 57.0 | 53.3 |
| | Bottom of Block | 58.5 | 56.9 | 54.9 |
| | *Average Density | 59.3 | 57.0 | 54.5 |
| 5. | 90% Compression Set (in %) | | | |
| | Top of Block | 44.2 | 20.0 | 17.4 |
| | Middle of Block | 31.4 | 15.5 | 17.1 |
| | Bottom of Block | 32.2 | 25.1 | 16.2 |
| | *Average Density | 35.9 | 20.2 | 16.9 |
| 6. | Porosity (Ft$^3$/Min) | | | |
| | Top of Block | 4.80 | 5.32 | 6.08 |
| | Middle of Block | 8.00 | 7.23 | 7.61 |
| | Bottom of Block | 5.87 | 5.34 | 6.32 |
| | *Average Density | 6.22 | 5.95 | 6.67 |
| 7. | Tensile Strength (Lb/in$^2$) | | | |
| | Top of Block | 15.1 | 13.4 | 15.1 |
| | Middle of Block | 14.8 | 12.7 | 15.2 |
| | Bottom of Block | 13.6 | 14.8 | 15.5 |
| | *Average Density | 14.5 | 13.6 | 15.3 |
| 8. | Elongation (in %) | | | |
| | Top of Block | 160 | 175 | 150 |
| | Middle of Block | 190 | 133 | 200 |
| | Bottom of Block | 180 | 165 | — |
| | *Average Density | 176 | 158 | — |
| 9. | Tear Strength (Lb/in) | | | |
| | Top of Block | 2.45 | 2.34 | 2.37 |
| | Middle of Block | 2.65 | 2.23 | 2.82 |
| | Bottom of Block | 2.30 | 2.56 | 2.60 |
| | *Average Density | 2.47 | 2.38 | 2.60 |
| 10. | Resiliency (inches) | | | |
| | Top of Block | 43 | 45 | 46 |
| | Middle of Block | 45 | 46 | 44 |
| | Bottom of Block | 48 | 44 | 46 |
| | *Average Density | 45 | 45 | 45 |
| 11. | Height lost of Block (in %) | 2.2 | 2.2 | 2.2 |
| 12. | Potential for Discoloration | NONE | NONE | NONE |
| 13. | Maximum Exothermic (°F.) | 372.9 | 370.4 | 404.0 |
| 14. | Minimum Exothermic (°F.) | 131.7 | 110.7 | 134.5 |
| 15. | Time Remove Internal Heat, MIN | 14 | 7 | 7 |

As shown in Table IV, tear strength, tensile strength and indentation load deflection (all indicative of the degree of cross-linking achieved in the polyurethane), of the old formulation and New-3 and New-4 are substantially equivalent. This is surprising in that the TDI index for New-3 and New-4 were about 7% and 12% lower than that of the Old-2 formulation. Furthermore, indentation load deflection of New-3 and New-4 compared favorably with Old-2 also indicating sufficient cross-linking of the new formula despite their lower TDI index.

Sample density and porosity (both indicative of the efficiently of the foaming relation), indicate that even though a diminished amount of auxiliary foaming agent was utilized, only a minor decrease in foaming occurred.

Figure 11:
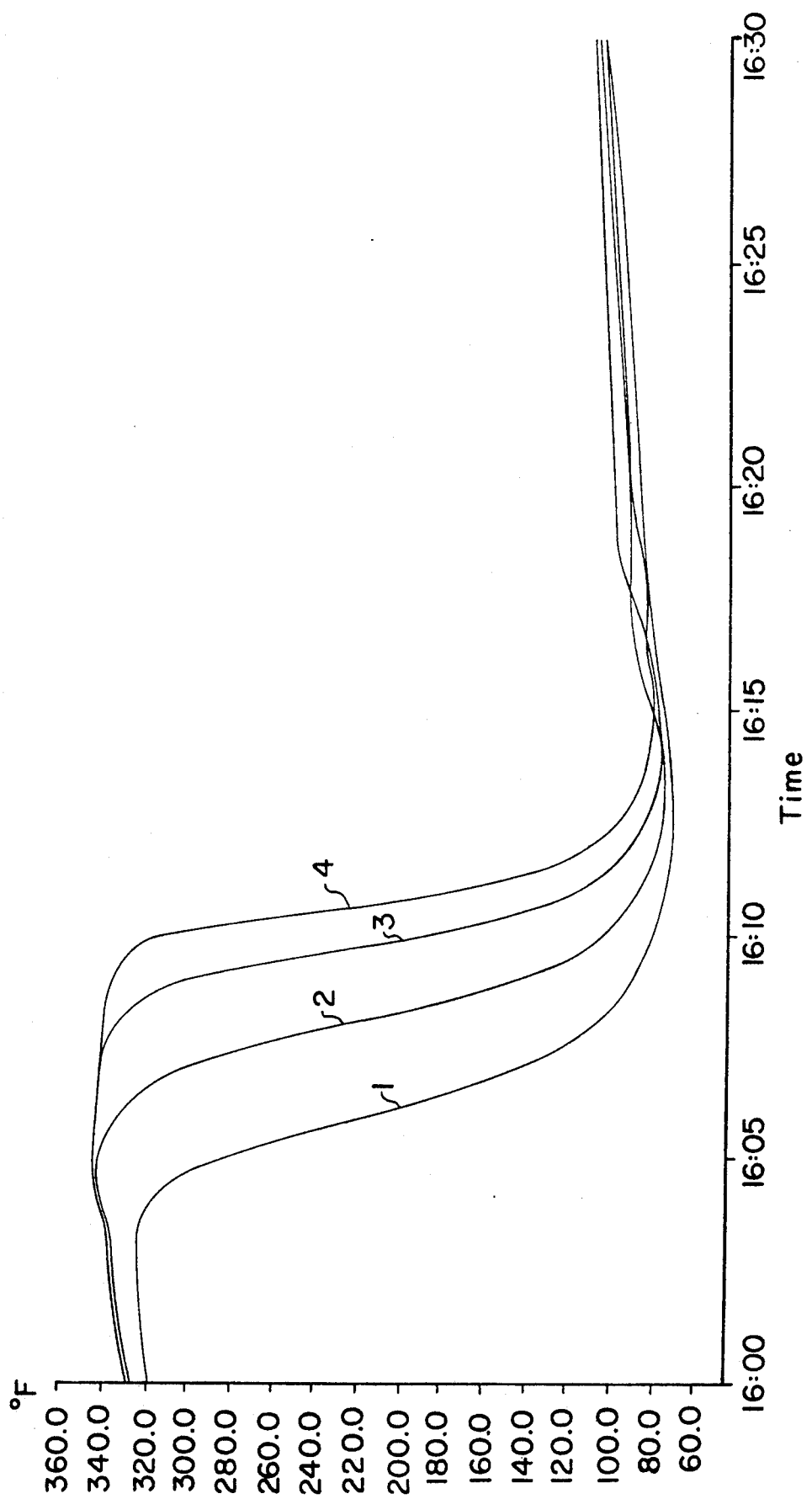

FIG. 11 is a time/temperature graph illustrating the rapid curing of the formulation listed as Old-2 in Table III. Slat conveyor speed was 4.16 feet/minute. The ambient temperature was 93° F. at a relative humidity of 32%. The tunnel temperature was 130° F. Fifteen minutes were required for the rapid cure to complete the cooling of the polyurethane blocks.

Figure 12:
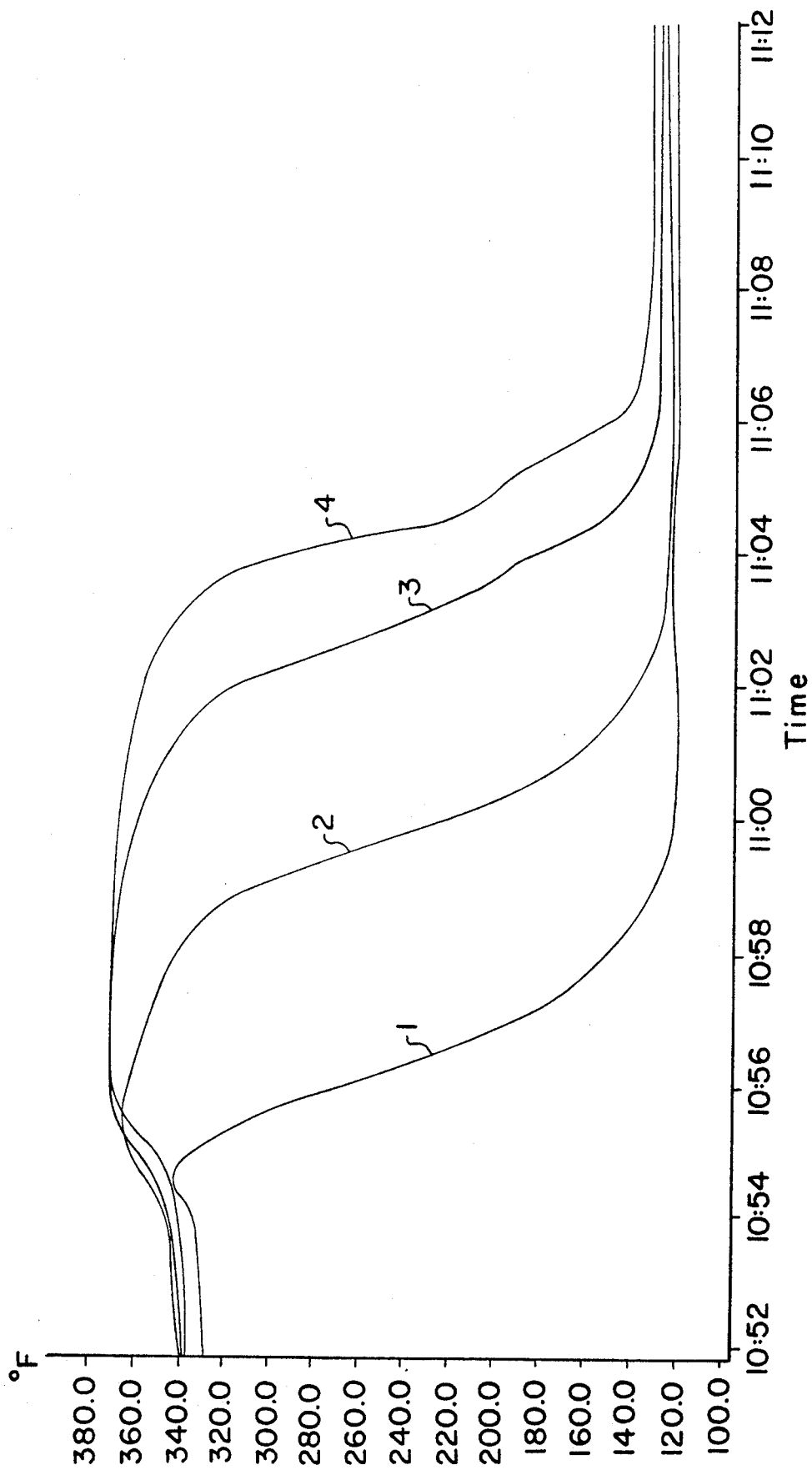

FIG. 12 is a time/temperature graph illustrating the rapid curing of the composition listed as New-3 in Table III especially formulated for the method of the present invention. Slat conveyor speed was 4.04 feet/minute. The ambient temperature was 55° F. at a relative humidity of 56%. The tunnel temperature was 124° F. The cooling duct supplied 36° F. air at 560 cfm to the enclosed tunnel. Nine minutes were required for the rapid cure to complete the cooling of the polyurethane blocks.

Figure 13:
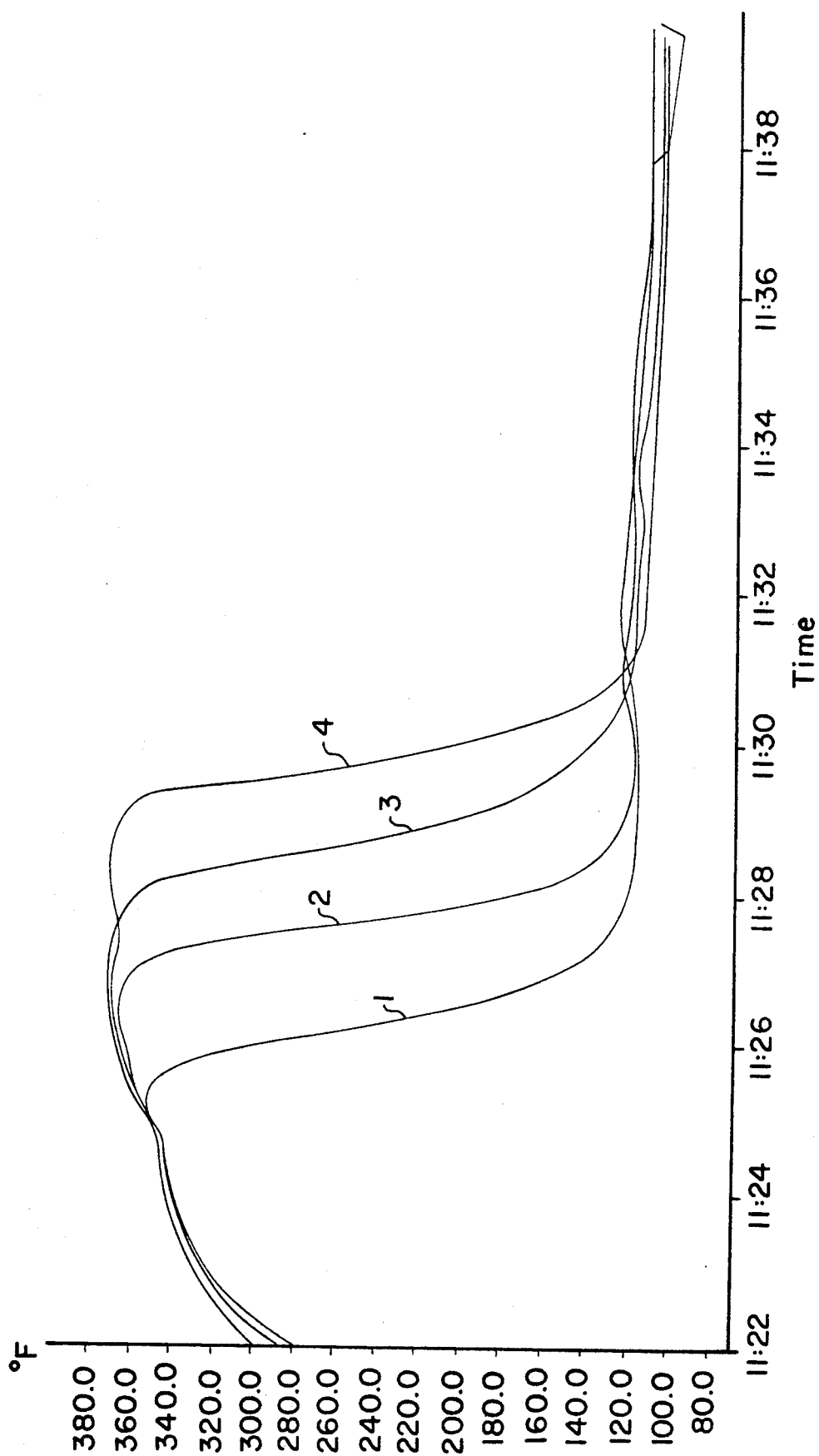

FIG. 13 is a time/temperature graph illustrating the rapid curing of the composition listed as New-4 in Table III especially formulated for the method of the present invention. Slat conveyor speed was 4.36 feet/minute. The ambient temperature was 68° F. at a relative humidity of 40%. The cooling duct supplied 35°-38° F. air at 1000 cfm to the enclosed tunnel. Twelve minutes were required for the rapid cure to complete the cooling of the polyurethane blocks.

EXAMPLE 3

Table V lists the components of a medium density/high indentation load deflection polyurethane formulation of the prior art (Old-3) and a polyurethane composition (New-5) especially formulated for use in the method of the present invention. As can be seen in Table V, the parts per weight of water in the new formulation, (4.567), is greater than that utilized in the old formulation (4.179). Methylene chloride, an auxiliary foaming agent is not present in the new formulation and is present in the old formulation (2.924). Yet, as discussed below, the absence of this auxiliary blowing agent in New-5 does not deleteriously affect the degree of polyurethane foaming since a greater percentage of water in the new formulation provides adequate foaming.

TABLE V

Foam Formulation for High Indentation Load Deflection and Medium Density

| CHEMICAL COMPONENTS | PARTS BY WEIGHT | |
|---|---|---|
| | OLD-3 | NEW-5 |
| Basic Polyol | 100 | 80 |
| Toluene Diisocyanate 80/20 | 55.496 | 55.803 |
| Water | 4.179 | 4.467 |
| Methylene Chloride | 2.924 | 0 |
| Silicone Surfactant DC 5160 | 0.901 | 0.901 |
| | 0.210 | 0.158 |
| Tin Catalyst | 0.092 | 0.075 |
| Amine 33-LV | 0 | 20 |
| Soft Polyol | 0 | 0 |
| Carapor 2001 | 12.999 | 12.999 |
| DE 60 F Special | 0.199 | 0.199 |
| Gold Pigment | 0.200 | 0.150 |
| Antioxidant | 116 | 102 |
| TDI Index (%) | | |

Table V lists a TDI index for the Old-3 formulation as being 116, or 116 isocyanate groups for every 100 hydroxyl groups with which they can react. The new formulation New-5 especially adapted for use in the method of the present invention exhibits a decreased TDI index of 102. Yet, as discussed below, this new formulation still exhibits satisfactory cross linking.

Table VI lists various physical property results for the medium density/high indentation load deflection polyurethane foam formulations of Table V. The physical property results were obtained from the two polyurethanes formulations represented in Table V after being subjected to initial curing and the rapid curing method of the present invention. Actual testing took place approximately 24 hours after completion of rapid cure.

TABLE VI

Physical Property Result for Middle Density and High Indentation Load Deflection

| | 24 HOURS AFTER TYPE OF TESTING | PROCESS | |
|---|---|---|---|
| | | OLD-3 | NEW-5 |
| 1. | Sample Density (Lbs/Ft) | | |
| | Top of Block | 1.41 | 1.44 |
| | Middle of Block | 1.42 | 1.42 |
| | Bottom of Block | 1.44 | 1.44 |
| | *Average Density | 1.42 | 1.43 |
| 2. | Identation Load Deflection, Lb | | |
| | Top of Block | 27.7 | 26.8 |
| | Middle of Block | 26.6 | 26.4 |
| | Bottom of Block | 26.6 | 27.1 |
| | *Average Density | 27.0 | 26.8 |
| 3. | Support Factor | | |
| | Top of Block | 2.04 | 2.20 |
| | Middle of Block | 2.04 | 2.16 |
| | Bottom of Block | 2.07 | 2.17 |
| | *Average Density | 2.05 | 2.18 |
| 4. | Hysteresis (in %) | | |
| | Top of Block | 68.0 | 66.7 |
| | Middle of Block | 69.1 | 69.3 |
| | Bottom of Block | 69.8 | 69.8 |
| | *Average Density | 69.9 | 68.6 |
| 5. | 90% Compression Set (in %) | | |
| | Top of Block | 16.8 | 10.5 |
| | Middle of Block | 67.2 | 10.9 |
| | Bottom of Block | 39.9 | 12.0 |
| | *Average Density | 41.3 | 11.1 |
| 6. | Porosity (Ft/Min) | | |
| | Top of Block | 4.22 | 4.58 |
| | Middle of Block | 5.02 | 4.92 |
| | Bottom of Block | 4.72 | 4.27 |
| | *Average Density | 4.65 | 4.59 |
| 7. | Tensile Strength (Lb/in) | | |
| | Top of Block | 12.3 | 16.8 |
| | Middle of Block | 12.0 | 17.5 |
| | Bottom of Block | 16.0 | 16.5 |
| | *Average Density | 13.4 | 16.9 |
| 8. | Elongation (in %) | | |
| | Top of Block | 192 | 183 |
| | Middle of Block | 208 | 217 |
| | Bottom of Block | 192 | 158 |
| | *Average Density | 197 | 186 |
| 9. | Tear Strength (Lb/in) | | |
| | Top of Block | 1.96 | 2.61 |
| | Middle of Block | 1.95 | 2.74 |
| | Bottom of Block | 2.62 | 3.00 |
| | *Average Density | 2.18 | 2.78 |
| 10. | Resiliency (inches) | | |
| | Top of Block | 45 | 47 |
| | Middle of Block | 44 | 46 |
| | Bottom of Block | 48 | 46 |
| | *Average Density | 46 | 46 |
| 11. | Height lost of Block (in %) | 2.2 | 2.2 |
| 12. | Potential for Discoloration | NONE | NONE |
| 13. | Maximum Exothermic (°F.) | 322.8 | 334.9 |
| 14. | Minimum Exothermic (°F.) | 103.5 | 134.9 |
| 15. | Time Remove Internal Heat, MIN | 16 | 14 |

As shown in Table VI, tear strength, tensile strength and indentation load deflection (all indicative of the degree of cross-linking achieved in the polyurethane), demonstrate that cross-linking in New-5 is equal to or greater than that found in Old-3 even though the TDI index of New-5 is significantly lower.

Sample density and porosity (both indicative of the efficiency of the foaming reaction), indicate that even though a diminished amount of auxiliary foaming agent was utilized, both the old and new formulations achieved substantially equal foaming.

Figure 14:
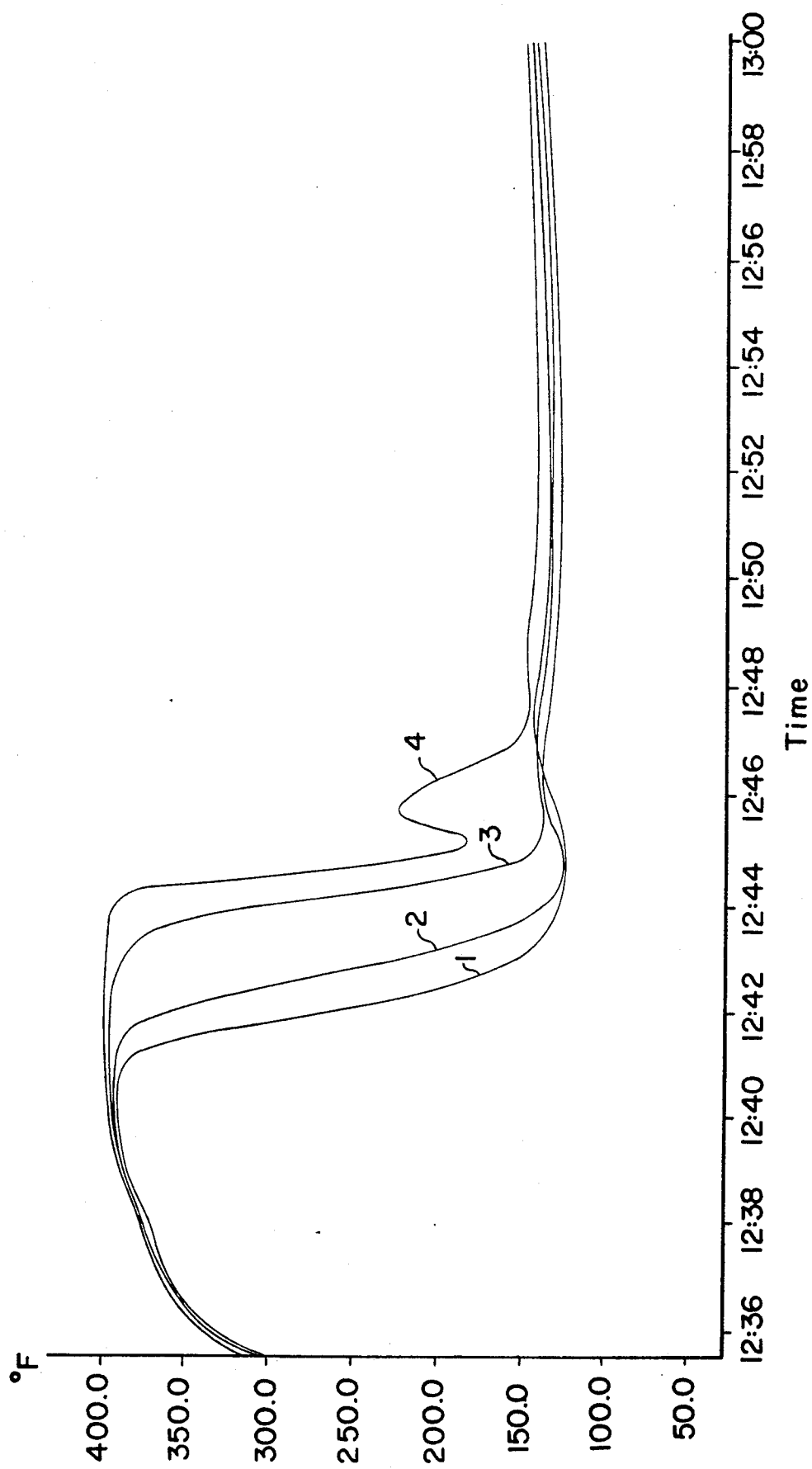

FIG. 14 is a time/temperature graph illustrating the rapid curing of the composition listed as Old-3 in Table V. Slat conveyor speed was 3.46 feet/minute. The ambient temperature was 72° F. at a relative humidity of 75%. The cooling duct supplied 43° F. cool air at 1062.5 cfm to the enclosed tunnel. Fifteen minutes were required for the rapid cure to complete the cooling of the polyurethane blocks.

Figure 15:
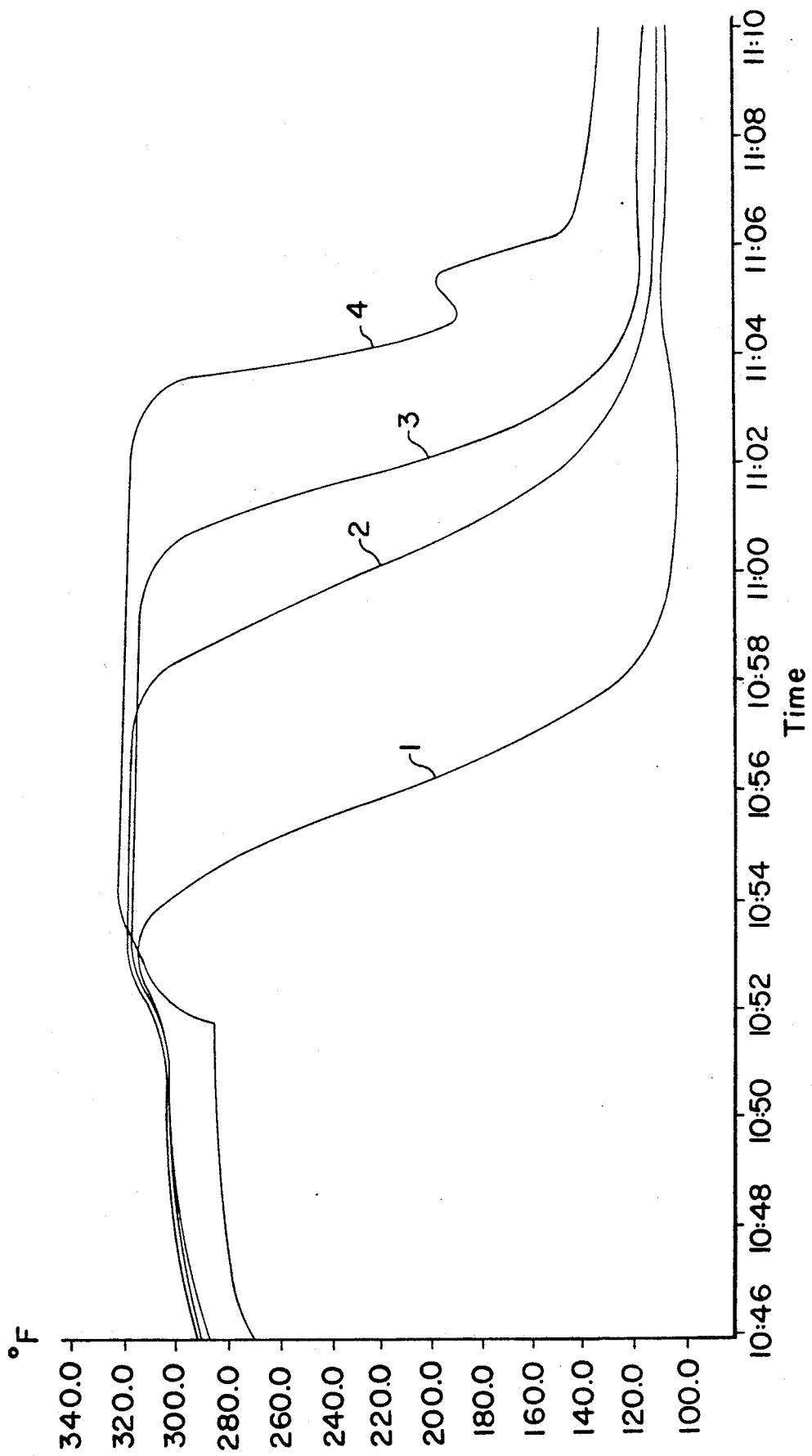

FIG. 15 is a time/temperature graph illustrating the rapid curing of the composition listed as New-5 in Table V. Slat conveyor speed was 3.41 feet/minute. The ambient temperature was 53° F. at a relative humidity of 64%. The cooling duct supplied 38° F. air at 500 cfm to the enclosed tunnel. Approximately 15 minutes were required for the rapid cure to complete the cooling of the polyurethane blocks.

EXAMPLE 4

Table VII lists the components of a high density/high indentation load deflection polyurethane formulation of the prior art (Old-4) and two polyurethane compositions (New-7 and New-8) especially formulated for use in the method of the present invention.

TABLE VII

Foam Formulation for High Indentation Load Deflection and High Density

| CHEMICAL COMPONENTS | PARTS BY WEIGHT | | |
|---|---|---|---|
| | OLD-3 | NEW-6 | NEW-7 |
| Basic Polyol | 100 | 80 | 80 |
| Toluene Diisocyanate 80/20 | 37.554 | 41.467 | 42.327 |
| Water | 2.697 | 3.086 | 3.3 |
| Methylene Chloride | 5 | 2 | 0 |
| Silicone Surfactant DC 5160 | 1.001 | 1.005 | 1.005 |
| Tin Catalyst | 0.265 | 0.191 | 0.165 |
| Amine 33-LV | 0.04 | 0.097 | 0.097 |
| Soft Polyol | 0 | 20 | 20 |
| Carapor 2001 | 0 | 0 | 0 |
| TDI Index (%) | 112 | 103 | 100 |

As can be seen from Table VII, the parts by weight of water in the new formulations, (3.086 and 3.3), is greater than that utilized in the Old formulation (2.697). Methylene chloride, an auxiliary foaming agent is not present in New-8 and is present in an amount (2) which is significantly less than that included in the Old-4 formulation (5). Yet, as discussed below, the absence or reduction of this auxiliary blowing agent in the new formulations does not deleteriously affect the degree of polyurethane foaming since a greater percentage of water provides adequate foaming.

Table VII lists a TDI index for the Old-4 formulation as being 112, or 112 isocyanate groups for every 100 hydroxyl groups with which they can react. The new formulations New-7 and New-8 especially adapted for use in the method of the present invention exhibit a decreased TDI index of 103 and 100 respectively. Yet, as discussed below, when cured according to the method of the present invention, these new formulation still exhibit satisfactory cross linking.

Table VIII lists various physical property results for the high density/high indentation load deflection polyurethane foam formulations of Table VII. The physical property results were obtained from the two polyurethanes represented in Table I after being subjected to initial curing and the rapid curing method of the present invention. Actual testing took place approximately 24 hours after completion of rapid cure.

TABLE VIII

Physical Property Result for Low Density and High Indentation Load Deflection

| 24 HOURS AFTER TYPE OF TESTING | PROCESS | | |
|---|---|---|---|
| | OLD-3 | NEW-6 | NEW-7 |
| 1. Sample Density (Lbs/Ft$^3$) | | | |
| Top of Block | 1.80 | 1.76 | 1.82 |
| Middle of Block | 1.79 | 1.78 | 1.85 |
| Bottom of Block | 1.80 | 1.82 | 1.87 |
| *Average Density | 1.80 | 1.79 | 1.85 |
| 2. Indentation Load Deflection, Lb | | | |
| Top of Block | 29.4 | 31.8 | 31.8 |
| Middle of Block | 30.6 | 28.5 | 30.1 |
| Bottom of Block | 29.9 | 28.8 | 29.3 |
| *Average Density | 30.0 | 29.7 | 30.4 |
| 3. Support Factor | | | |
| Top of Block | 1.95 | 2.03 | 2.05 |
| Middle of Block | 1.92 | 2.17 | 2.16 |
| Bottom of Block | 1.97 | 2.15 | 2.10 |
| *Average Density | 1.95 | 2.12 | 2.10 |
| 4. Hysteresis (in %) | | | |
| Top of Block | 80.6 | 77.7 | 76.9 |
| Middle of Block | 79.7 | 78.6 | 78.0 |
| Bottom of Block | 81.6 | 78.1 | 77.4 |
| *Average Density | 80.6 | 78.1 | 77.4 |
| 5. 90% Compression Set (in %) | | | |
| Top of Block | 10.4 | 6.2 | 4.9 |
| Middle of Block | 10.3 | 6.2 | 6.4 |
| Bottom of Block | 10.3 | 7.1 | 5.8 |
| *Average Density | 10.3 | 6.5 | 5.7 |
| 6. Porosity (Ft$^3$/Min) | | | |
| Top of Block | 3.50 | 3.33 | 3.75 |
| Middle of Block | 4.53 | 3.80 | 3.96 |
| Bottom of Block | 3.47 | 3.90 | 3.42 |
| *Average Density | 3.83 | 3.68 | 3.71 |
| 7. Tensile Strength (Lb/in) | | | |
| Top of Block | 13.9 | 14.1 | 16.7 |
| Middle of Block | 14.2 | 15.2 | 16.4 |
| Bottom of Block | 15.4 | 16.2 | 17.0 |
| *Average Density | 14.5 | 15.2 | 16.7 |
| 8. Elongation (in %) | | | |
| Top of Block | 120 | 133 | 217 |
| Middle of Block | 126 | 125 | 175 |
| Bottom of Block | 150 | 167 | 200 |
| *Average Density | 132 | 142 | 197 |
| 9. Tear Strength (Lb/in) | | | |
| Top of Block | 2.10 | 2.22 | 2.47 |
| Middle of Block | 2.43 | 2.59 | 2.84 |
| Bottom of Block | 2.25 | 2.43 | 3.19 |
| *Average Density | 2.25 | 2.41 | 2.83 |
| 10. Resiliency (inches) | | | |
| Top of Block | 46.0 | 48.0 | 47.0 |
| Middle of Block | 48.0 | 50.0 | 48.0 |
| Bottom of Block | 47.0 | 49.0 | 48.0 |
| *Average Density | 47.0 | 49.0 | 47.7 |
| 11. Height lost of Block (in %) | 2.2 | 2.2 | 2.2 |
| 12. Potential for Discoloration | NONE | NONE | NONE |
| 13. Maximum Exothermic (°F.) | 264.1 | 288.2 | 300.0 |
| 14. Minimum Exothermic (°F.) | VARY | 125.0 | 140.0 |
| 15. Time Remove Internal Heat, MIN | IN-COMPLE | 20 | 20 |

As shown in Table VIII, tear strength, tensile strength and indentation load deflection (all indicative of the degree of cross-linking achieved in the polyurethane), shown that cross-linking in New-6 and New-7 is substantially equal to or greater than that found in Old-4 even though the TDI index of New-5 is significantly lower.

Sample density and porosity (both indicative of the efficiency of the foaming reaction), indicate that even though a diminished amount of auxiliary foaming agent was utilized in New-6 and New-7, they achieve substantially the same foaming results as does the old formulation with its higher percentage of blowing agent.

Figure 16:
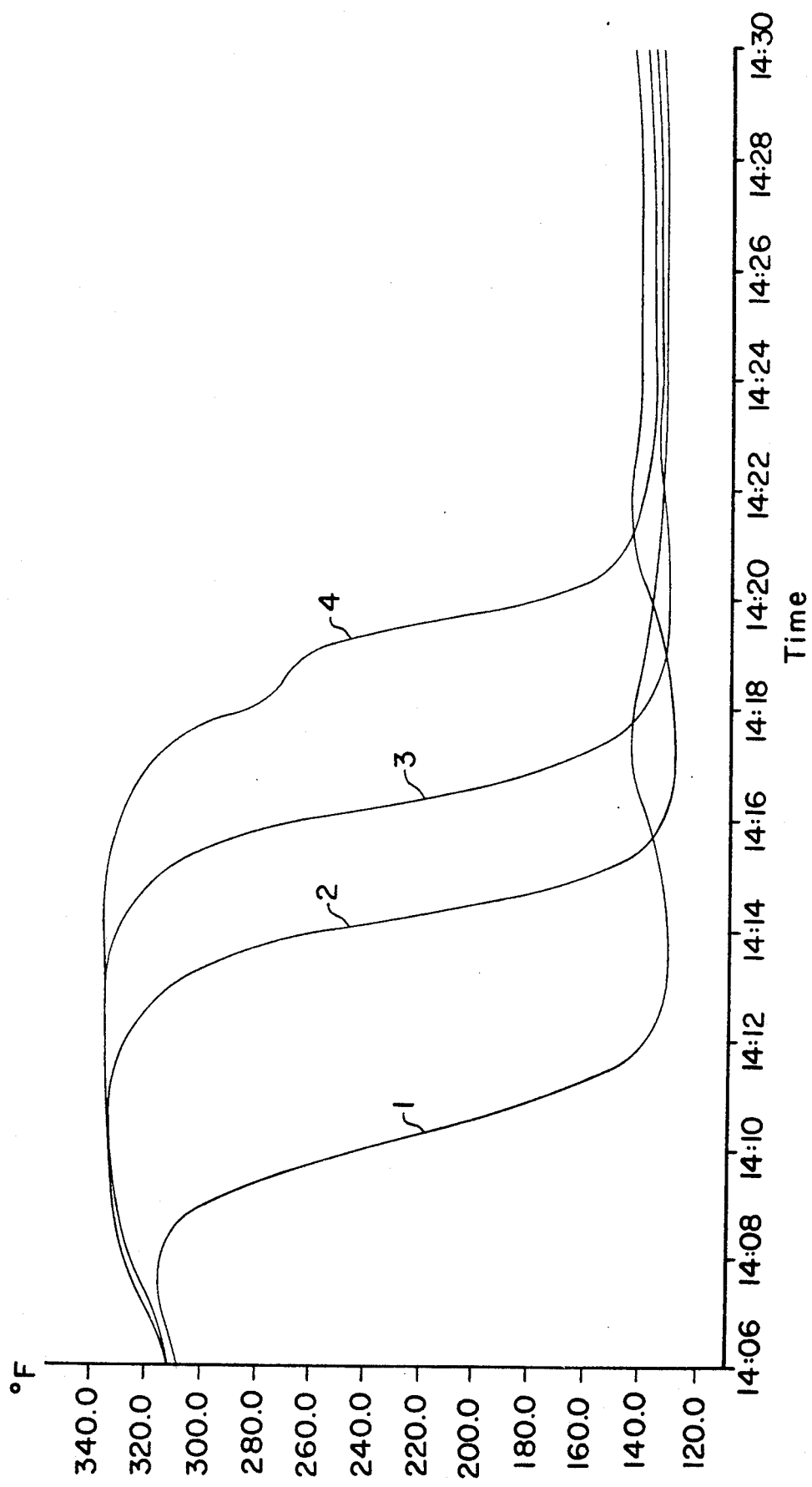

FIG. 16 is a time/temperature graph illustrating the rapid curing of the composition listed as Old-4 in Table VII. Slat conveyor speed was 2.34 feet/minute. The ambient temperature was 75° F. at a relative humidity of 78%. Nine minutes were required for the rapid cure to complete the cooling of the polyurethane blocks.

Figure 17:
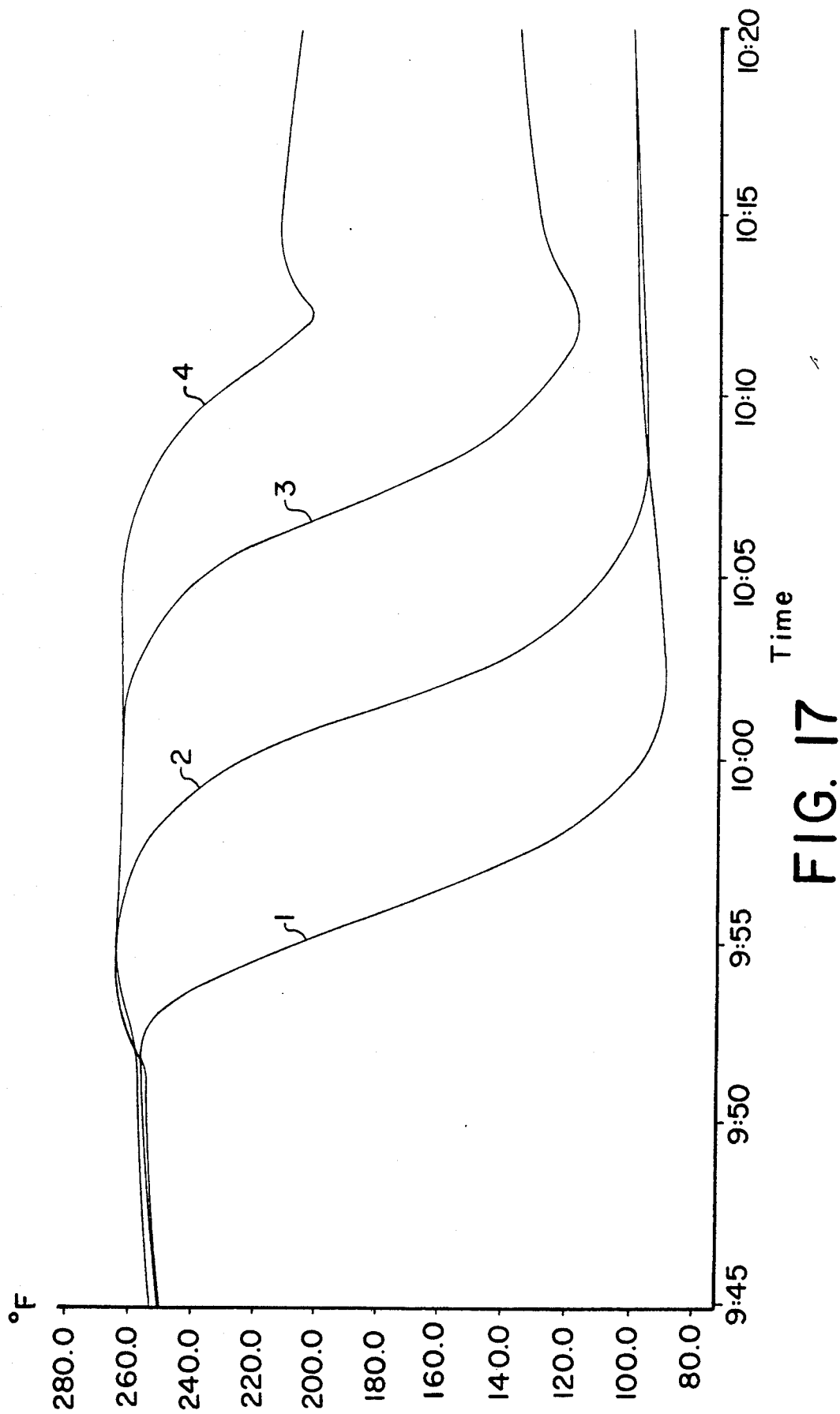

FIG. 17 is a time/temperature graph illustrating the rapid curing of the composition listed as New-6 in Table VII. Slat conveyor speed was 2.61 feet/minute. The ambient temperature was 49° F. at a relative humidity of 49%. The cooling duct supplied 37° F. air at 500 cfm to the enclosed tunnel. Approximately 8 minutes were required for the rapid cure to complete the cooling of the polyurethane blocks.

Figure 18:
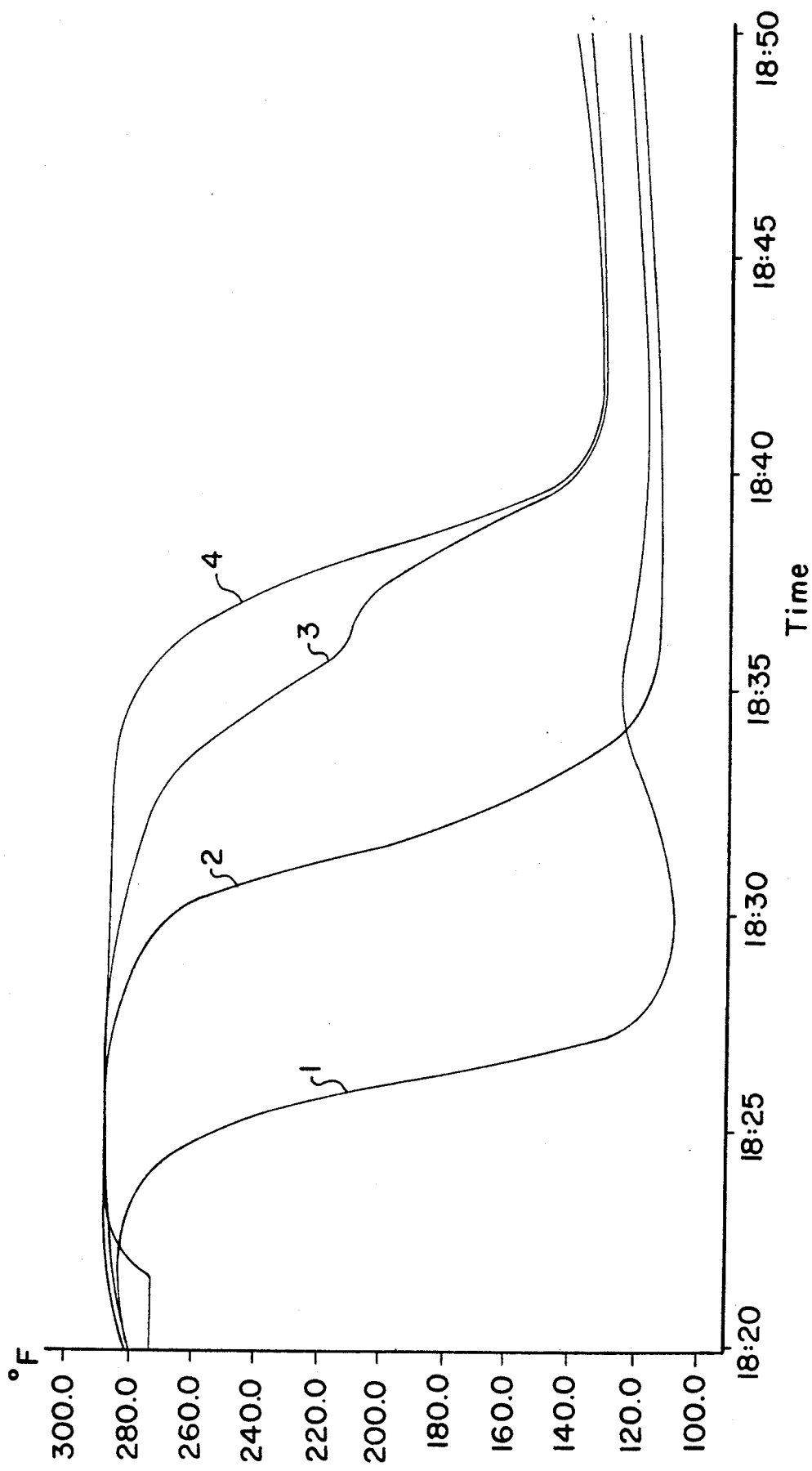
Figure 19:
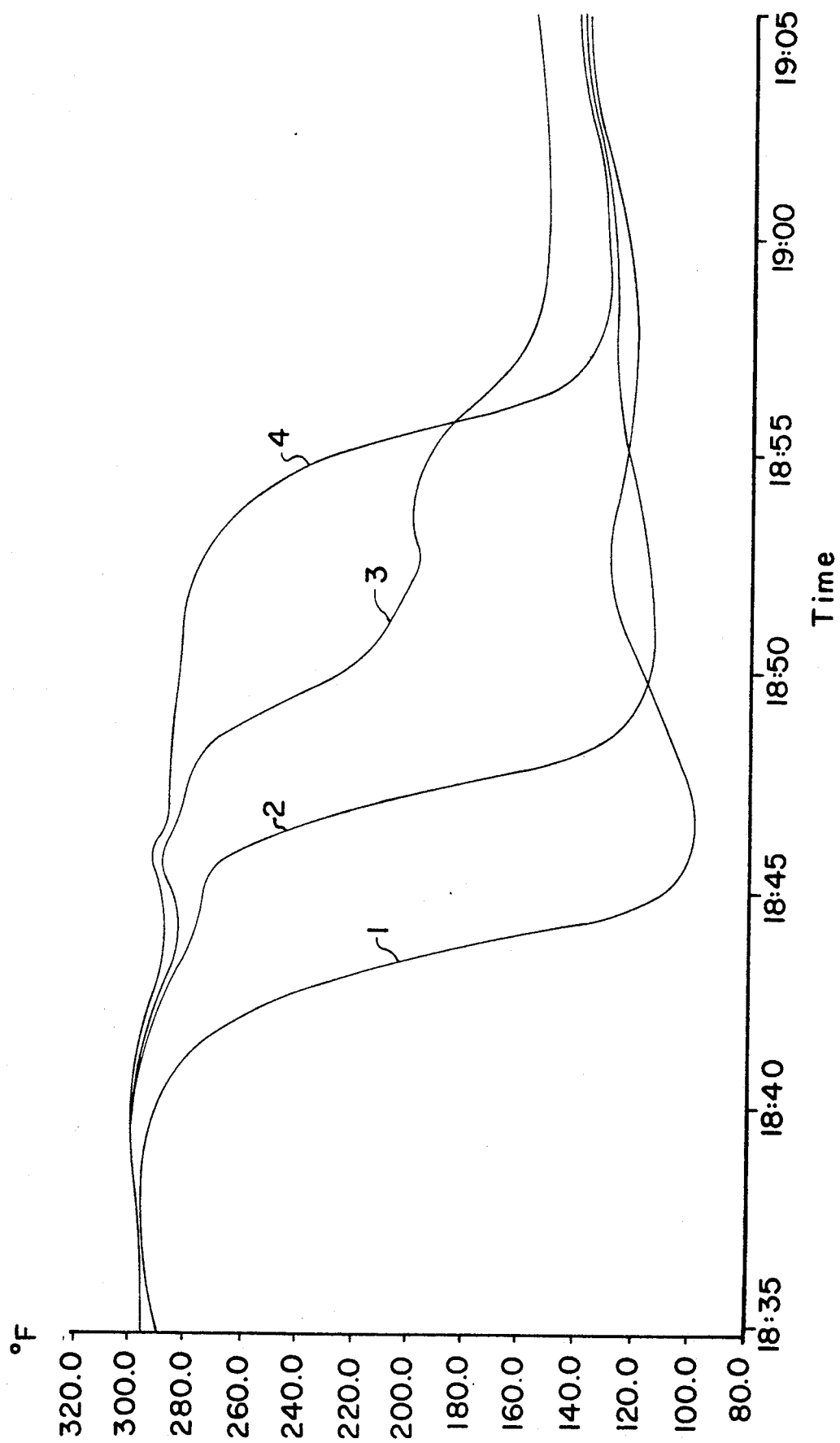

FIG. 18 is a time/temperature graph illustrating the rapid curing of the composition listed as New-7 in Table VII. Slat conveyor speed was 2.52 feet/minute. The ambient temperature was 49° F. at a relative humidity of 41%. The cooling duct supplied 36° F. air at 500 cfm to the enclosed tunnel. Approximately 9 minutes were required for the rapid cure to complete the cooling of the polyurethane blocks.

While it is apparent that the invention herein disclosed is well calculated to fulfill the objects above stated, it will be appreciated that numerous embodiments and modification may be devised by those skilled in the art, and it is intended that the appended claims cover all such modification and embodiments as fall within the true spirit and scope of the present invention.

I claim:

1. A method of rapidly curing porous foam materials comprising:
    a first cooling step including drawing ambient air through a porous foam material thereby removing volatile gasses, moisture and heat from said material and thereafter venting said air to the atmosphere;
    a second cooling step including cooling and drawing ambient air through said foam material after said first cooling step thus removing sublimates and heat therein and thereby heating and incorporating sublimates in said ambient air to form heated ambient air, thereafter adding fresh cooled ambient air so as to cool said heated ambient air to form a cooled air mixture, said cooling condensing said sublimates therein, thereafter recycling said cooled air mixture through said porous foam material thereby filtering and trapping said condensed materials within said foam material; and
    a third cooling step including drawing ambient air through the porous foam material after subjecting the foam to the second cooling step, said ambient air removing moisture, heat and volatiles from said foam, thereafter venting said ambient air to the atmosphere; wherein
    said porous foam material is rapidly cured without exhibiting slow oxidation or outright combustion.

2. The method of claim 1 wherein the second cooling step comprises:
    directing ambient air through a cooling means to provide cooled ambient air;
    drawing said cooled ambient air through said porous foam material to remove heat and sublimates therefrom, thus heating said cooled ambient air;
    subsequently adding fresh cooled air to said heated ambient air to form a cooled air mixture; and
    recycling said cooled air mixture through said porous material without passing through said cooling means.

3. The method of claim 1 further comprising reacting said foam material for a time corresponding to a peak of an exothermic time/temperature curve before subjecting said foam material to the first cooling step.

4. The method of claim 1 further comprising selecting said ambient air to have a temperature of from about 60° to 90° F., and cooling said cooled air to a temperature range of from about 30° to 55° F.

5. The method of claim 4 further comprising selecting said ambient air to have a temperature of from about 70° to 85° F. and cooling said cooled air to a temperature of from about 35° to 45° F.

6. The method of claim 1 further comprising selecting a foam formulation to include an increased amount of water as a foaming agent, said increased amount of water providing increased foaming of said foam material while simultaneously obviating or reducing the amount of toxic auxiliary blowing agents required wherein said first and said third cooling steps remove excess water which is not utilized for foaming so as to prevent its further reaction with the foam material and wherein said vented air of said first and third cooling steps includes a reduced amount, or no toxic auxiliary blowing agents.

7. The method of claim 1 wherein said second cooling step comprises:
    removing sublimated foam reactants and antioxidants from said foam material by drawing said cooled air through said foam material;
    condensing said reactants and antioxidants by adding fresh cooled air to said heated air; and
    filtering and trapping said sublimates within the foam material wherein said reactants further react and strengthen said material and said antioxidants are redeposited.

8. The method of claim 1 further comprising selecting polyurethane foam as said porous foam material.

9. A method of rapidly curing porous polyurethane foam materials comprising:
    initially reacting a polyurethane formulation so as to form a porous foam material;
    drawing ambient air through said initially reacted porous foam material in a first cooling step, said ambient air removing volatile gasses, moisture and heat from said material, thereafter venting said air to the atmosphere;
    drawing cooled ambient air in a second cooling step through said foam material subsequent to subjecting the foam to said first cooling step, said cooled ambient air removing sublimates and heat from said foam material thereby heating said ambient air and incorporating sublimates therein, thereafter adding fresh cooled ambient air to said heated ambient air to form a cooled air mixture wherein said sublimates condense, thereafter recycling said cooled air mixture through said porous foam material thereby filtering and trapping said sublimates therein; and
    drawing ambient air in a third cooling step through the porous foam subsequent to subjecting the foam to the second cooling step, said ambient air removing moisture, heat and volatiles from said foam, thereafter venting said air to the atmosphere; wherein said porous foam material is rapidly cured without exhibiting slow oxidation or outright combustion while minimizing emission of pollutants and conserving valuable reactants.

10. The method of claim 9 further comprising selecting said polyurethane formulation to include at least one polyol, toluene diisocyanate, water, an auxiliary blowing agent, and at least one catalyst, said formulation having a TDI index wherein said index is the ratio of isocyanate groups of the toluene diisocyanate to hydroxyl groups of polyol with which the toluene diisocyanate reacts to form polyurethane bonds.

11. The method of claim 9 wherein the second cooling step comprises directing ambient air through a cooling means to provide cooled ambient air, drawing said cooled ambient air through said polyurethane material to remove heat and sublimates therefrom, thus heating said cooled ambient air and subsequently adding fresh cooled air to said heated ambient air to form a cooled air mixture which is recycled through said porous material without passing through said cooling means.

12. The method of claim 11 wherein the second cooling step comprises:
drawing said cooled air through said foam material, thereby removing heat and TDI sublimate therein;
adding fresh cooled ambient air so as to reduce the temperature of the ambient air heated by said foam material thereby condensing said TDI in said cooled air mixture; and
recycling said cooled air mixture through said polyurethane material where said condensed TDI is filtered and trapped so as to provide further reaction with polyol therein.

13. The method of claim 12 further comprising reacting said condensed TDI with polyol within said foam block to increase cross-linking of said polyurethane.

14. The method of claim 13 further comprising selecting said polyurethane formulation to include a decreased TDI index, said recycling and reaction of TDI sublimate during said second cooling step conserving said TDI and allowing said decreased TDI index.

15. The method of claim 10 further comprising selecting said polyurethane foam formulation to include an increased amount of water as a foaming agent, said increased amount of water providing sufficient foaming of said foam material while simultaneously obviating or reducing the amount of toxic auxiliary blowing agents required to achieve said sufficient foaming; and
removing said excess water in said first and said third cooling steps which is not utilized for foaming so as to prevent its further reaction with the foam material; wherein
said vented air of said first and third cooling steps includes a reduced amount of toxic auxiliary blowing agents.

16. The method of claim 10 further comprising selecting said polyurethane formulation to additionally include an anti-oxidant, said anti-oxidant sublimating in said polyurethane foam during exothermic reaction thereof; and
removing said sublimated anti-oxidant by drawing said cooled air through said foam block and thereafter condensing and redepositing said antioxidant within said polyurethane foam material.

17. The method of claim 15 further comprising selecting said formulation to contain no auxiliary blowing agents.

18. An apparatus for rapidly cooling, degassing and dehumidifying initially cured porous foam material while minimizing emission of pollutants comprising:
a conveyor means for transporting porous foam material from a site of initial reaction to and through an enclosed cooling tunnel; and
an enclosed cooling tunnel wherein ambient air and cooled ambient air are utilized to remove heat, moisture and volatile gasses from said material while conserving and redepositing valuable sublimated reactants therein.

19. The apparatus of claim 18 wherein said enclosed tunnel comprises an elongated rectangular structure having a length and including an entrance opening at one end and an exit opening at an opposite end, said conveyor means traversing the length of said tunnel.

20. The apparatus of claim 19 wherein said enclosed cooling tunnel includes three sections and said conveyor means is a slat conveyor, said slat conveyor providing transportation of said foam material from a site of initial cure to and through said enclosed tunnel.

21. The apparatus of claim 20 wherein said enclosed cooling tunnel utilizes ambient air and recycled cooled ambient air to remove heat, moisture and volatile gasses from said foam material while conserving and redepositing valuable sublimates therein.

22. The apparatus of claim 21 wherein said enclosed tunnel comprises:
a first cooling section including means for drawing ambient air through, so as to remove heat, humidity and volatile gasses from foam material located on a portion of said conveyor positioned within said first section, said first section further including a means for venting said ambient air to the atmosphere after said air passes through said foam material; the atmosphere;
a second cooling section including a means for drawing cooled ambient air through, so as to remove heat and sublimates from, said foam material positioned on a portion of the slat conveyor located within said second section, said second section further including a means for adding fresh cooled ambient air to air containing sublimates from and heated by passing said air through said foam, wherein said sublimates are condensed in a resultant cooled air mixture which is thereafter recycled through said porous foam material wherein said condensed sublimate is filtered and redeposited; and
a third cooling section including means for drawing ambient air through, so as to remove heat, humidity and volatile gasses from porous foam material located on a portion of said slat conveyor positioned within said third section, said third section further including a means for venting said ambient air after passing through said material to the atmosphere.

23. The apparatus of claim 22 wherein said slat conveyor means transports said foam material through said entrance opening of said enclosed tunnel, said conveyor thereafter sequentially conveying said porous foam material through said first, second and third sections thereafter conveying said material out through said exit opening of said tunnel.

24. The apparatus of claim 23 wherein said slat conveyor is comprised of a plurality of slats, said slats defining spaces located therebetween whereby air may be effectively be drawn through said slat conveyor and said foam material positioned thereon.

25. The apparatus of claim 24 wherein said slat conveyor includes a gasket located thereon, said gasket especially configured and adapted to cover an area of said slat conveyor not occupied by said foam material during operation of said apparatus, said gasket thereby directing substantially all air drawn through said conveyor through said porous foam material.

26. The apparatus of claim 25 wherein said slat conveyor includes two peripheral edges, said conveyor also including a gasket positioned over a marginal area thereof extending inwardly from about 200 to 300 cm from said peripheral edges, said marginal area corresponding to an area of said slat conveyor not covered by a foam block positioned on said conveyor whereby said gasket provides a seal forcing air to be drawn through said foam material.

27. The apparatus of claim 23 wherein said enclosed tunnel further comprises:
   a first cooling section, said first section located within said enclosed tunnel adjacent said entrance opening at one end and adjacent a second cooling section at an opposite end, said first section including a means for drawing ambient air through said porous foam material, said air removing volatile gasses, heat and moisture therein and said first section additionally including a means for venting said drawn air to the atmosphere;
   a second cooling section, said second section located adjacent and contiguous with said first cooling section at one end and a third cooling section at an opposite end, said second cooling section including a means for drawing cooled ambient air through and thus removing sublimates and heat from foam material located on a portion of said conveyor positioned within said second section and additionally including a means for thereafter cooling and recycling said drawn air through said foam so as to condense, filter and trap said sublimates within said material; and
   a third cooling section, said third cooling section located adjacent and contiguous with said second cooling section at one end and said exit opening of said enclosed tunnel at an opposite end, said third cooling section including a means for drawing ambient air through said porous foam material for removing volatile gasses, moisture and heat therefrom and including a means for venting said drawn air to the atmosphere.

28. The apparatus of claim 27 wherein the first cooling section comprises:
   a first suction fan located outside and adjacent to the first section of said enclosed tunnel;
   a first vacuum duct providing an air conduit between said first vacuum fan and a first vacuum box located in a lower portion of said first section of the enclosed tunnel;
   a first vacuum box occupying a lower portion of said first gas extracting section of the enclosed tunnel below a level of the slat conveyor located therein; and
   a first emission duct providing a conduit from said first vacuum fan to an emission point locate centrally above the enclosed tunnel; wherein
   ambient air is drawn through the entrance opening of said enclosed tunnel and further drawn through foam material positioned on a portion of the slat conveyor located within the first section of the enclosed tunnel, said ambient air removing heat, humidity and volatile gasses from said foam material, said ambient air then being drawn into the first vacuum box located thereunder by a vacuum created in said box by said first suction fan drawing air out of said first suction box through said first vacuum duct, said air then being driven by said first suction fan through said first emission duct to said emission point where said air is vented to the atmosphere.

29. The apparatus of claim 27 wherein said second cooling section comprises:
   a second suction fan located outside and adjacent to said second section;
   a second vacuum duct providing an air conduit between said second suction fan and a second vacuum box located in a lower portion of said second section;
   a second vacuum box located in the second section below a level of the slat conveyor located therein;
   a return duct providing a conduit from the second suction fan to an upper portion of the second section;
   a cooling fan located outside said tunnel adjacent said second suction fan, said cooling fan communicating with the upper portion of said second section by means of a cooling duct; and
   a chiller unit located outside said tunnel and adjacent said cooling fan, said cooling unit operatively connected to coolant coils located within said cooling duct by means of coolant pipes; whereby
   said cooling fan forces ambient air having a temperature through said cooling duct wherein said cooling coils reduce the temperature of said ambient air, said chiller unit providing a circulation of cool liquid through said coolant pipes to said cooling coils so as to provide a reduction in temperature of said coils, said cooled ambient air then passing through said cooling duct into an upper portion of said second section wherein said cooled air is drawn through porous foam material located on a portion of the slat conveyor positioned in the second section by a vacuum created in said second vacuum box, said cooled air removing heat and sublimates from said material, said second suction fan drawing air through said second suction duct from said vacuum box thereby drawing said cooled air through said material, said suction fan then driving said air through said return duct to an upper portion of said second section wherein said heated air mixes with fresh cooled ambient air provided by the coolant duct thereby condensing sublimates in said heated air and providing a cooled air mixture, said cooled air mixture thereafter recycling through said foam material wherein said condensed sublimates are filtered and trapped.

30. The apparatus of claim 27 wherein the third cooling section comprises:
   a third suction fan located outside and adjacent to the third section of the enclosed tunnel;
   a third vacuum duct providing an air conduit between said third suction fan and a third vacuum box located in a lower portion of the third section of the enclosed tunnel;
   a third vacuum box occupying a lower portion of said third cooling section of said enclosed tunnel below a level of the slat conveyor located therein; and a second emission duct providing a conduit from said third vacuum fan to an emission point located centrally above the enclosed tunnel; whereby ambient air is drawn through said exit opening of said enclosed tunnel and further drawn through foam material positioned on a portion of the slat conveyor located within the third section of the enclosed tunnel, said ambient air removing heat, humidity and volatile gasses from said foam material, said ambient air then being drawn into the third vacuum box located thereunder by a vacuum created in said box by said third suction fan drawing air out of said third suction box through said third vacuum duct, said air then being driven by said third suction fan through said third emission duct to said emission point where, said air is vented to the atmosphere.

31. A polyurethane foam formulation comprising at least one polyether polyol, an isocyanate compound, at least one softening agent, water and an auxiliary blowing agent, said formulation including an increased weight percent of water as compared to conventional rapid cure polyurethane formulations thereby providing increased foaming without substantially reacting with free isocyanate groups after initial reaction of said polyurethane, said formulation including a decreased weight percent of auxiliary blowing agents as compared to conventional rapid cure polyurethane formulations, said agents being reduced without adversely effecting the foaming of said polyurethane and said formulation having a decreased TDI index as compared to conventional rapid cure polyurethane formulations, the cross-linking of said polyurethane remaining substantially equal to that provided by conventional formulations having a higher TDI index; wherein said specially adapted polyurethane formulation provides a porous foam product achieving substantially equal tensile strength, hardness, density and porosity as compared to conventional rapid cure formulations while reducing emission of pollutants and conserving valuable reactants during cure.

32. The polyurethane foam formulation of claim 31, wherein said formulation includes from about 1 to 5 weight percent water.

33. The polyurethane formulation of claim 31 wherein said formulation includes from about 2 to 4 weight percent water.

34. The polyurethane formulation of claim 31 wherein said at least one polyether polyol comprises a high molecular weight and a low molecular weight polyol.

35. The polyurethane formulation of claim 34 wherein said low molecular weight polyol has a molecular weight range of from about 1200 to 1800 and said high molecular weight polyol has a molecular weight of at least about 2500 to 3500.

36. The polyurethane formulation of claim 35 wherein said low molecular weight polyol has a functionality of about 90 to 150 and said high molecular weight polyol has a functionality of about 30 to 90.

37. The polyurethane formulation of claim 31 wherein said formulations includes from about 1.0 to 8.0 weight percent auxiliary blowing agent.

38. The polyurethane formulation of claim 31 wherein said formulations includes less than 4 weight percent auxiliary blowing agent.

39. The polyurethane formulation of claim 31 wherein said formulations includes less than 2 weight percent auxiliary blowing agent.

40. The polyurethane formulation of claim 31 wherein said formulations includes no auxiliary blowing agent.

41. The polyurethane formulation of claim 31 wherein said formulation has a TDI index of from about 1 to 14 percent less than the TDI index of said conventional formulations.

42. The polyurethane formulation of claim 41 said formulation has a TDI index of from about 2 to 12 percent less than the TDI index of said conventional formulations.

43. The polyurethane formulation of claim 42 wherein said formulation has a TDI index of from about 4 to 10 percent less than the TDI index of said conventional formulations.

44. The polyurethane formulation of claim 31 wherein said diisocyanate is toluene diisocyanate.

45. The polyurethane formulation of claim 31 wherein said at least one softening agent includes a sodium salt of polyacrylic acid.

46. The polyurethane formulation of claim 45 wherein said sodium salt of polyacrylic acid comprises from about 0.01 to 1 weight percent of said formulation.

47. A method of reducing the production and emission of pollutants during the cooling of polyurethane foam products comprising:

selecting a polyurethane foam formulation comprising at least one polyol, a diisocyanate, at least one softening agent, an auxiliary blowing agent, and water wherein said formulation includes a reduced weight percentage of auxiliary blowing agent and an increased weight percentage of water as compared to conventional rapid cure polyurethane formulations;

reacting said formulation until said reaction reaches a peak as described in a time temperature graph of the reaction;

subsequently drawing ambient air through said foam material wherein volatile gasses and excess moisture is removed therefrom and vented to the atmosphere;

thereafter cooling ambient air and drawing said cooled air through said material thereby removing additional heat and sublimates therefrom and heating said cooled air;

adding fresh cooled ambient air to said heated air to form a cool air mixture thereby condensing sublimates therein;

recycling said cooled air mixture through said foam material wherein said condensed sublimates are filtered and trapped; and thereafter drawing additional ambient air through said material so as to remove remaining heat, moisture and volatiles therefrom and venting said air to the atmosphere; wherein said vented air contains a reduced amount of toxic blowing agents and sublimates as compared to prior methods and valuable sublimates are conserved by said filtering and trapping thereof in said polyurethane foam material.

* * * * *

UNITED STATES PATENT AND TRADEMARK OFFICE
CERTIFICATE OF CORRECTION

PATENT NO. : 5,171,756
DATED : December 15, 1992
INVENTOR(S) : Ricciardi et al

It is certified that error appears in the above-indentified patent and that said Letters Patent is hereby corrected as shown below:

Column 11, line 58, change "487 5" to --45--.

Claim 36, Column 29, line 62, insert --hydroxyl-- before "func-".

Claim 36, Column 29, line 64, change "90" to --80--.

Signed and Sealed this

Twelfth Day of April, 1994

Attest:

BRUCE LEHMAN

Attesting Officer

Commissioner of Patents and Trademarks